US008970700B2

(12) United States Patent
Inoue et al.

(10) Patent No.: US 8,970,700 B2
(45) Date of Patent: Mar. 3, 2015

(54) IMAGING APPARATUS

(75) Inventors: Tokiko Inoue, Zama (JP); Norihiko Sasaki, Hanamaki (JP); Mitsuru Nakajima, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 13/153,955

(22) Filed: Jun. 6, 2011

(65) Prior Publication Data

US 2011/0298925 A1 Dec. 8, 2011

(30) Foreign Application Priority Data

Jun. 7, 2010 (JP) ................................. 2010-130358

(51) Int. Cl.
H04N 5/225 (2006.01)
H04N 7/18 (2006.01)

(52) U.S. Cl.
CPC ........... *H04N 5/2251* (2013.01); *H04N 5/2252* (2013.01)
USPC ........................................ 348/148; 348/374

(58) Field of Classification Search
CPC ..... H04N 5/2251; H04N 5/2252; H05K 5/00; H05K 1/00
USPC ................................. 348/148, 374
See application file for complete search history.

(56) References Cited

U.S. PATENT DOCUMENTS

| | | | |
|---|---|---|---|
| 5,381,176 A | 1/1995 | Tanabe et al. | |
| 6,900,843 B1 * | 5/2005 | Uchiyama | 348/374 |
| 2005/0254358 A1 | 11/2005 | Kosako | |
| 2008/0024883 A1 | 1/2008 | Iwasaki | |
| 2010/0118145 A1 * | 5/2010 | Betham et al. | 348/148 |
| 2010/0259616 A1 | 10/2010 | Nakajima et al. | |

FOREIGN PATENT DOCUMENTS

| | | |
|---|---|---|
| EP | 0 541 449 A2 | 5/1993 |
| JP | 7-255004 | 10/1995 |
| JP | 2002-72341 A | 3/2002 |
| JP | 2002-299866 A | 10/2002 |
| JP | 2005-252547 A | 9/2005 |
| JP | 2005-328202 A | 11/2005 |
| JP | 2006-327513 A | 12/2006 |
| JP | 2007-166292 A | 6/2007 |
| JP | 2008-33010 A | 2/2008 |
| JP | 2008-242187 A | 10/2008 |
| JP | 2009-200912 | 9/2009 |
| JP | 2010-11200 A | 1/2010 |
| JP | 2010-263606 A | 11/2010 |

* cited by examiner

Primary Examiner — Jamie Atala
Assistant Examiner — Nguyen Truong
(74) Attorney, Agent, or Firm — Dickstein Shapiro LLP

(57) ABSTRACT

An imaging apparatus includes: an electronic circuit unit (30) including an imaging device (31) to acquire an object image formed by an imaging optical system (20); and a housing member (13) housing the electronic circuit unit (30). The electronic circuit unit (30) includes a thermally-conductive heat transfer member (37) in contact with an outer peripheral surface thereof which is in parallel with a fitting direction of the electronic circuit unit (30) into the housing member (13). The heat transfer member (37) includes a soft material portion (37b) in contact with the outer peripheral surface of the electronic circuit unit (37), and a plate portion (37a) in contact with the soft material portion (37b) and an inner peripheral wall surface of the housing member (13). The soft material portion (37b) is made of a shape-conformable member.

11 Claims, 10 Drawing Sheets

IMAGING APPARATUS

CROSS-REFERENCE TO THE RELATED APPLICATIONS

This application is based on and claims the priority benefit of Japanese Patent Application No. 2010-130358, filed on Jun. 7, 2010, the contents of which are incorporated herein by reference.

BACKGROUND OF THE INVENTION

1. Technical Field

The present invention relates to an imaging apparatus used as a digital camera, digital video camera, and the like, and particularly to an imaging apparatus suitable for an in-vehicle camera and a surveillance camera.

2. Background Art

Heretofore, imaging apparatuses have been known which include an electronic circuit unit having an imaging device to acquire an object image formed by an imaging optical system including optical elements such as imaging lenses. A wide range of applications of such imaging apparatuses have been proposed such for example as an in-vehicle camera for supporting a driver's visual recognition from the inside of a vehicle, a surveillance camera installed on an automated teller machine (ATM), and the like, and there has been a demand for downsizing the apparatuses while securing the performances thereof. In this respect, there have been known imaging apparatuses with a configuration in which an electronic circuit unit is fitted into a box-shaped housing member with one end open through the open end, and thereby is housed in the housing member (for reference, see Japanese Patent Application Publication Nos. 2008-033010, 2005-252547, 2010-011200, 2005-328202, and 2002-072341).

In those imaging apparatuses, it is desirable to prevent increase in the temperature of the electronic circuit unit for the purpose of securing the performance of the electronic circuit unit. To achieve this, there have been proposed imaging apparatuses which allow efficient dissipation of heat from the electronic circuit unit (see Japanese Patent Application Publication Nos. 2005-252547, 2010-011200, 2005-328202, and 2002-072341 listed above, for example). Each of the imaging apparatuses disclosed in these patent literatures has a configuration in which, in order for the case or the like exposed to the outside to serve as a spot to dissipate the heat, the heat dissipation spot and the electronic circuit unit are joined by a soft heat transfer member being thermally conductive and excellent in shape conformability. According to this configuration, the top and bottom surfaces of the soft heat transfer member are brought into contact with the heat dissipation spot and the electronic circuit unit, respectively, so that the contact area between the heat dissipation spot and the electronic circuit unit can be increased by the soft heat transfer member. Accordingly, the heat of the electronic circuit unit can be efficiently dissipated from the heat dissipation spot.

CITATION LIST

Patent Literatures

[Patent Literature 1] Japanese Patent Application Publication No. 2008-033010
[Patent Literature 2] Japanese Patent Application Publication No. 2005-252547
[Patent Literature 3] Japanese Patent Application Publication No. 2010-011200
[Patent Literature 4] Japanese Patent Application Publication No. 2005-328202
[Patent Literature 5] Japanese Patent Application Publication No. 2002-072341

SUMMARY OF THE INVENTION

Now, assume a case where the above heat dissipation structure is applied to the aforementioned imaging apparatuses in which the electronic circuit unit is fitted into the box-shaped housing member with one end open through that open end. In this case, a conceivable configuration is such that a bottom wall portion of the housing member at the other end serves as a heat dissipation spot and that the bottom wall portion and the housed electronic circuit unit are joined by the soft heat transfer member. In this configuration, however, the soft heat transfer member is in contact only with a portion of the electronic circuit unit which faces the bottom wall portion of the housing member. Thus, a contact region allowing the contact with the soft heat transfer member is small, making it impossible to achieve a sufficient heat dissipation effect. To expand the contact region, it may be conceivable to increase the area of the portion of the electronic circuit unit which faces the bottom wall portion of the housing member, but such increase causes a problem of increasing the size of the bottom wall portion, i.e., the housing member.

Then, it may be conceivable to employ a configuration in which peripheral wall portions of the housing member extending from the bottom wall portion to the open end serve as heat dissipation spots, and these peripheral wall portions and outer peripheral surfaces of the electronic circuit unit are joined by the soft heat transfer members, respectively. In this configuration, however, in the fitting of the electronic circuit unit into the housing member, the soft heat transfer members may be caught on the open end and inner peripheral wall surfaces of the housing member if the electronic circuit unit is fitted after the soft heat transfer members are set on the outer peripheral surfaces of the electronic circuit unit. On the other hand, the outer peripheral surfaces of the electronic circuit unit may be caught on the soft heat transfer members if the electronic circuit unit is fitted after the soft heat transfer members are set on the inner peripheral wall surfaces of the housing member. Thus, the assemblability may be lowered (deteriorated). In addition, if the electronic circuit unit is forcedly fitted into the housing member despite the caught state, force is applied to the soft heat transfer members in the direction of the relative movement of the housing member and the electronic circuit unit. This makes it difficult to achieve desired contact states of the soft heat transfer members with the outer peripheral surfaces of the electronic circuit unit and desired contact states of the soft heat transfer members with the inner peripheral wall surfaces of the housing member. Thus, there is a possibility that the heat dissipation effect may not be achieved as intended.

An object of the present invention is to provide an imaging apparatus having a configuration in which an electronic circuit unit is fitted into a housing member through an opening in the housing member and by which a sufficient heat dissipation effect can be achieved without impeding downsizing thereof.

To accomplish the above object, an imaging apparatus according to one embodiment of the present invention for achieving the above object includes: an electronic circuit unit including an imaging device to acquire an object image formed by an imaging optical system; and a housing member housing the electronic circuit unit.

The electronic circuit unit includes a thermally-conductive heat transfer member in contact with an outer peripheral surface thereof which is in parallel with a fitting direction of the electronic circuit unit into the housing member. The heat transfer member includes a soft material portion in contact with the outer peripheral surface of the electronic circuit unit, and a plate portion in contact with the soft material portion and an inner peripheral wall surface of the housing member.

The soft material portion is made of a shape-conformable member.

DETAILED DESCRIPTION OF THE PREFERRED EMBODIMENTS

Figure 1:
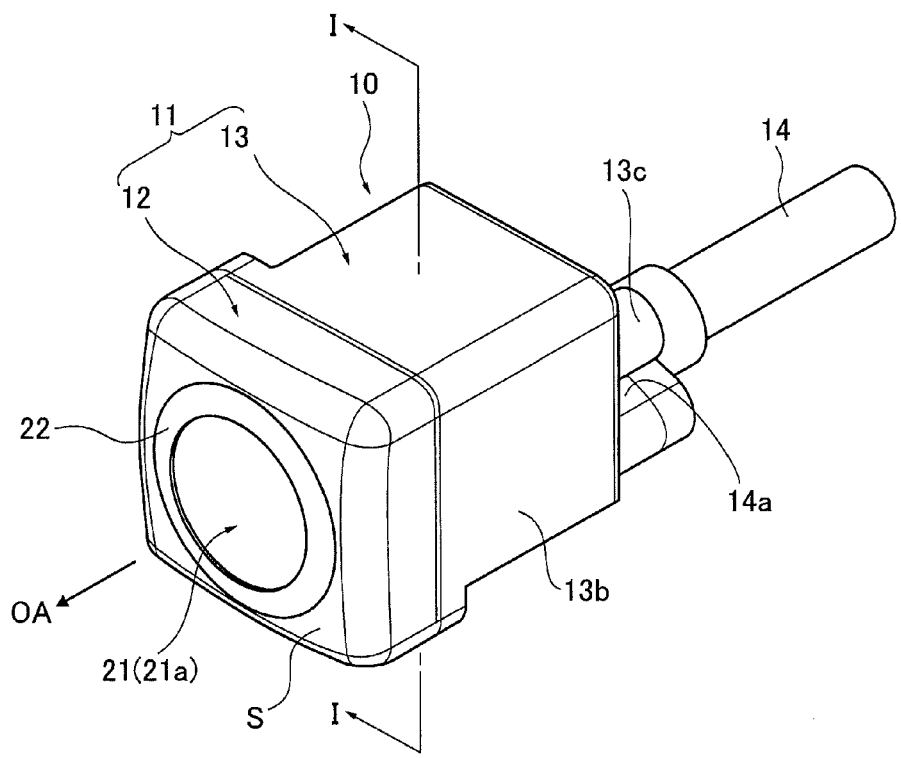
FIG. 1 is an explanatory view for describing a schematic configuration of an imaging apparatus 10 of the present invention viewed from a front side.

Hereinbelow, preferred embodiments of an imaging apparatus of the present invention will be described with reference to the accompanying drawings.

Embodiment 1

First, a schematic configuration of an imaging apparatus 10 of the present invention will be described referring to FIGS. 1 to 11. The imaging apparatus 10 is mainly formed of an imaging optical system 20 and an electronic circuit unit 30 which are housed inside a case 11. In the following, an object side of the imaging apparatus 10 in a direction along an imaging optical axis OA of the imaging optical system 20 is referred to as front (the direction indicated by the arrow OA), and the opposite side is referred to as rear.

In Embodiment 1, the case 11 includes: a front case part 12 supporting the imaging optical system 20; and a rear case part 13 housing the electronic circuit unit 30. The front case part 12 constitutes a front part of the case 11 (front case part) and forms an outer surface S surrounding a periphery of a lens system 21 of the imaging optical system 20 as viewed in a direction (hereinafter, also referred to as radial direction) perpendicular to the imaging optical axis OA of an object lens (later-described object lens 21a in this example) of the lens system 21.

Figure 3:
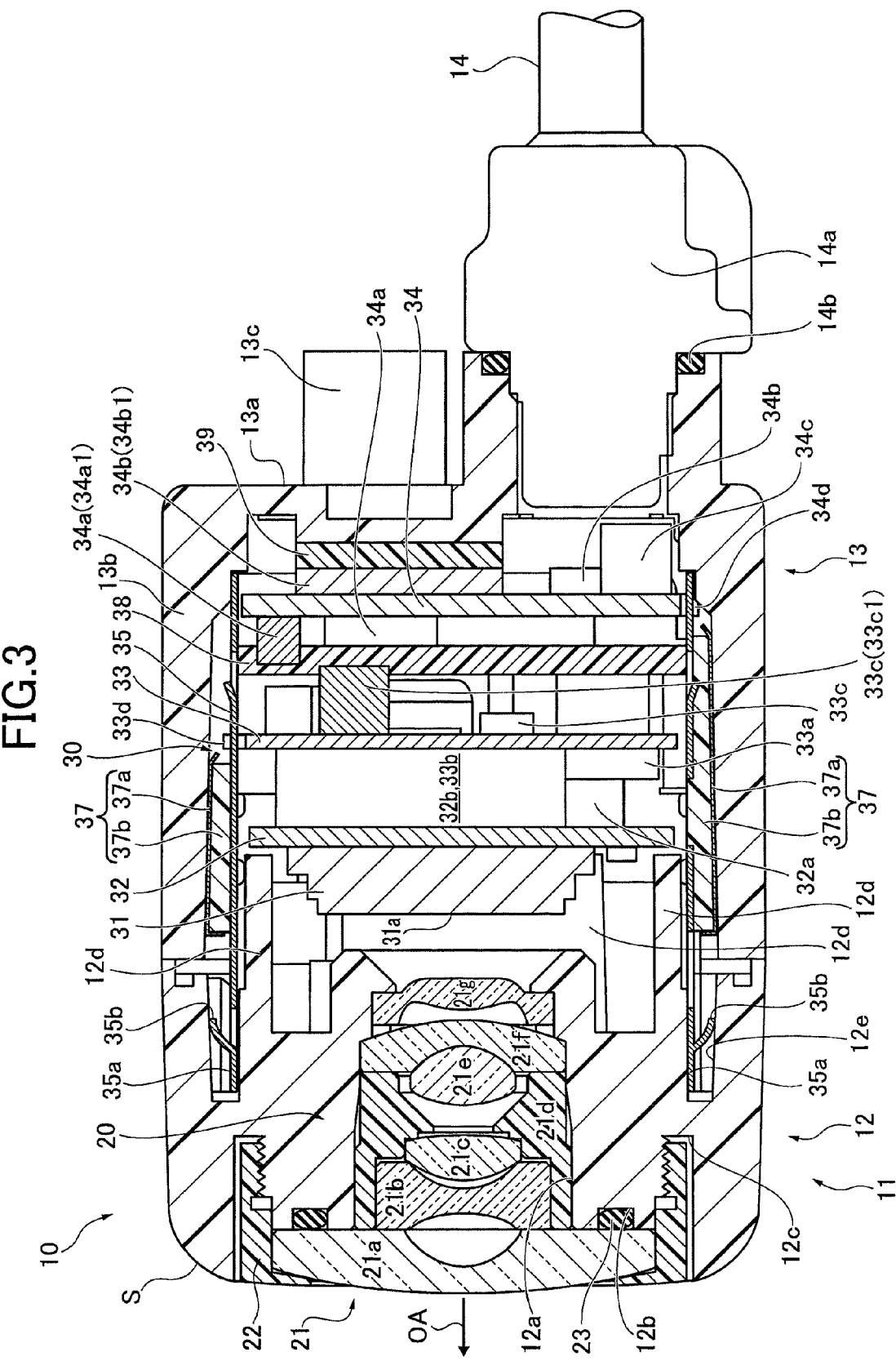
FIG. 3 is a schematic cross-sectional view of the imaging apparatus taken along I-I line of FIG. 1.

As shown in FIG. 3, the front case part 12 has: a retaining hole 12a to house the imaging optical system 20; an annular sealing groove 12b surrounding a front portion of the retaining hole 12a with a larger diameter; and a threaded groove 12c surrounding the annular sealing groove 12b, i.e., the retaining hole 12a in a front end surface. The retaining hole 12a is a through-hole in a stepped columnar shape with the imaging optical axis OA as its axis and is capable of retaining a later-described optical element array 21 of the imaging optical system 20 in a proper position and posture. The annular sealing groove 12b is a recess to dispose a later-described sealing member 23. The threaded groove 12 c is configured such that a later-described fall prevention member 22 can be screwed thereto.

The front case part 12 also has: four supporting wall portions 12d (only three are shown in FIG. 3) extending toward the rear (the rear case part 13) from a rear end surface of the front part 12 facing the rear case part 13; and an annular fixing groove 12e surrounding the supporting wall portions 12d. In a cross section perpendicular to the imaging optical axis OA, these four supporting wall portions 12d each form a pair with its diagonally opposite supporting wall portion 12d in a way to surround the imaging optical axis OA, and serve as portions to support a later-described first board 32. Moreover, the annular fixing groove 12e is a groove provided to the rear end surface of the front case part 12 in a way to surround the four supporting wall portions 12d and is capable of receiving a base end portion 35a of a later-described shield case 35.

Figure 2:
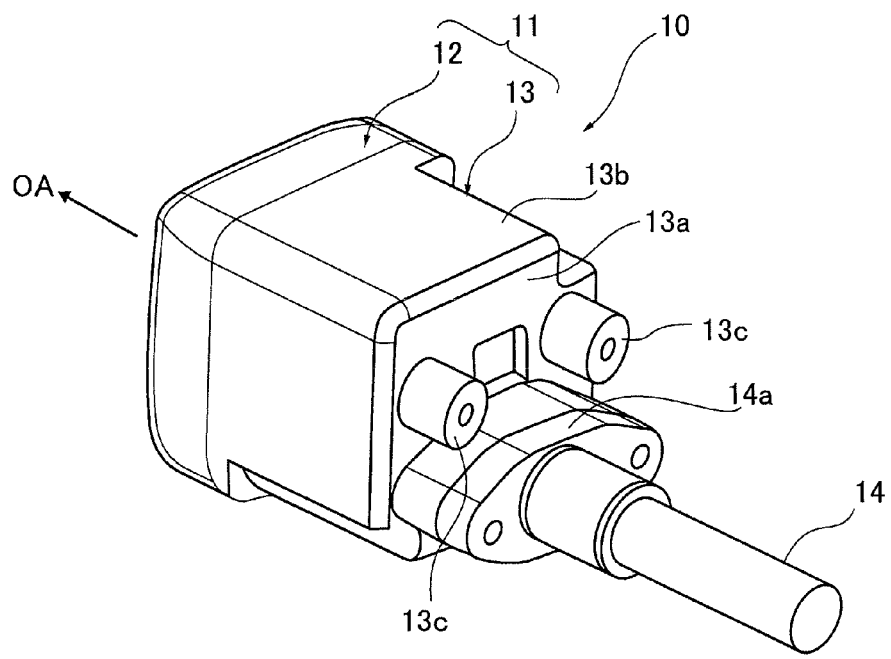
FIG. 2 is an explanatory view for describing the schematic configuration of the imaging apparatus viewed from a rear side.

The rear case part 13 attached to the rear end of the front case part 12 constitutes a rear part of the case 11 (rear case part). The rear case part 13 is made of a material excellent in thermal conductivity and is made of an aluminum alloy in Embodiment 1. The rear case part 13 has a box shape with one end open and includes a bottom wall portion 13a on a rear end side and a tubular peripheral wall portion 13b extending from the bottom wall portion 13a to the open end. The rear case part 13 is designed to be able to have the electronic circuit unit 30 fitted thereinto through the open end, and has a size (depth) large enough to house the electronic circuit unit 30 attached to the front case part 12. Hence, the rear case part 13 functions as a housing member, and the direction of the imaging optical axis OA is the direction to fit the electronic circuit unit 30 into the front case part 12. As shown in FIGS. 2 and 3, the rear case part 13 includes, on an outer wall surface of the bottom wall portion 13a, two attachment protrusions 13c via which the case 11, i.e., the imaging apparatus 10 is attached to a desired position. Each of these attachment protrusions 13c is a boss portion having a screw hole therein.

The rear case part 13 also includes a connecting cord 14 to supply power to the electronic circuit unit 30 (later-described electronic circuit) and transfer image data acquired by a later-described imaging device 31 of the electronic circuit unit 30. This connecting cord 14 can be connected to the electronic circuit unit 30 while securing a sealing performance between the rear case part 13 and the outside. In Embodiment 1, the connecting cord 14 includes a connector portion 14a at one end thereof on the rear case part 13 side. This connector portion 14a is fixed by an unillustrated threaded member to a rear end surface of the rear case part 13 with an O-ring 14b interposed therebetween as a sealing member. Some alternative configurations having a sealing performance include: one in which a connecting hole (unillustrated) is provided through the rear case part 13, the connecting cord 14 is inserted into the connecting hole, and a waterproofing adhesive is applied around the connected portion; and one in which the connecting cord 14 (covering member thereof) is formed integrally with the rear case part 13. Though not illustrated, a sealing member (e.g., O-ring, flat packing, etc.) is interposed between a front end surface of the rear case part 13 and a rear end surface of the front case part 12, and the front and rear end surfaces are brought into contact with each other and coupled together with screws or the like. In this way, the front and rear case parts 12 and 13 form the case 11 housing the imaging optical system 20 and the electronic circuit unit 30 while achieving a waterproof function and a dustproof function (hereinafter, also referred to as sealing performance) at their coupled portions.

The imaging optical system 20 is designed to form an image at a given position as a process for image acquisition, includes at least one optical element, and has a configuration that is suitable to the optical performance required by the imaging apparatus 10 (imaging optical system 20). The imaging optical system 20 includes an optical element array 21 formed of multiple optical elements and housed in the retaining hole 12a in the front case part 12. In Embodiment 1, the optical element array 21 includes a lens 21a, a lens 21b, a lens 21c, a lens 21d, a lens 21e, a lens 21f, and a lens 21g which are arranged in this order from the object side. Thus, in the optical element array 21, the lens 21a is the object lens situated closest to the object. Moreover, the retaining hole 12a (front case part 12) functions as a lens barrel that retains the optical element array 21 serving as the imaging optical system 20. In the following, an optical axis in the imaging optical system 20, i.e., the rotational axis of symmetry of each of the lenses 21a to 21g (including the diaphragm 21d) located along the center axis of the optical element array 21 (retaining hole 12a) is the imaging optical axis OA of the imaging optical system 20, i.e., the imaging apparatus 10.

The optical element array 21 inserted in the retaining hole 12a is prevented by the fall prevention member 22 from falling off an opening at a larger inside diameter portion side. The fall prevention member 22 has a cylindrical shape with a size that is large enough to surround an outer peripheral surface of the lens 21a being the object lens. Specifically, the diameter of the fall prevention member 22 is such that its front end portion (object side end portion) can come into contact with an edge portion of the front surface of the lens 21a (a portion outside the effective area) from an outer side (front side). Moreover, the fall prevention member 22 has a screw groove in a rear end portion thereof and can be screwed to the threaded groove 12c. The fall prevention member 22 is screwed to the threaded groove 12c with the optical element array 21 being properly inserted in the retaining hole 12a and the annular sealing member 23 being disposed in the annular sealing groove 12b. In this way, the fall prevention member 22 is attached to the front case part 12 in such a way to cover the lens 21a while pressing the lens 21a toward the rear end surface (toward the rear case part 13 (image surface)). As a result, the sealing member 23 disposed between a rear surface of the lens 21a and the annular sealing groove 12b is appropriately compressed. Hence, in the imaging optical system 20, the appropriately compressed sealing member 23 prevents the intrusion of water, dust, and the like into the retaining hole 12a from a periphery of the lens 21a, providing a sufficient sealing performance. As described, in the imaging optical system 20, the front case part 12 (retaining hole 12a) sealingly holds the optical element array 21 (the lens 21a as the object lens), thereby providing a desired optical performance. The electronic circuit unit 30 (later-described imaging device 31) is disposed at the image formation position of the optical element array 21 of the imaging optical system 20.

Figure 4:
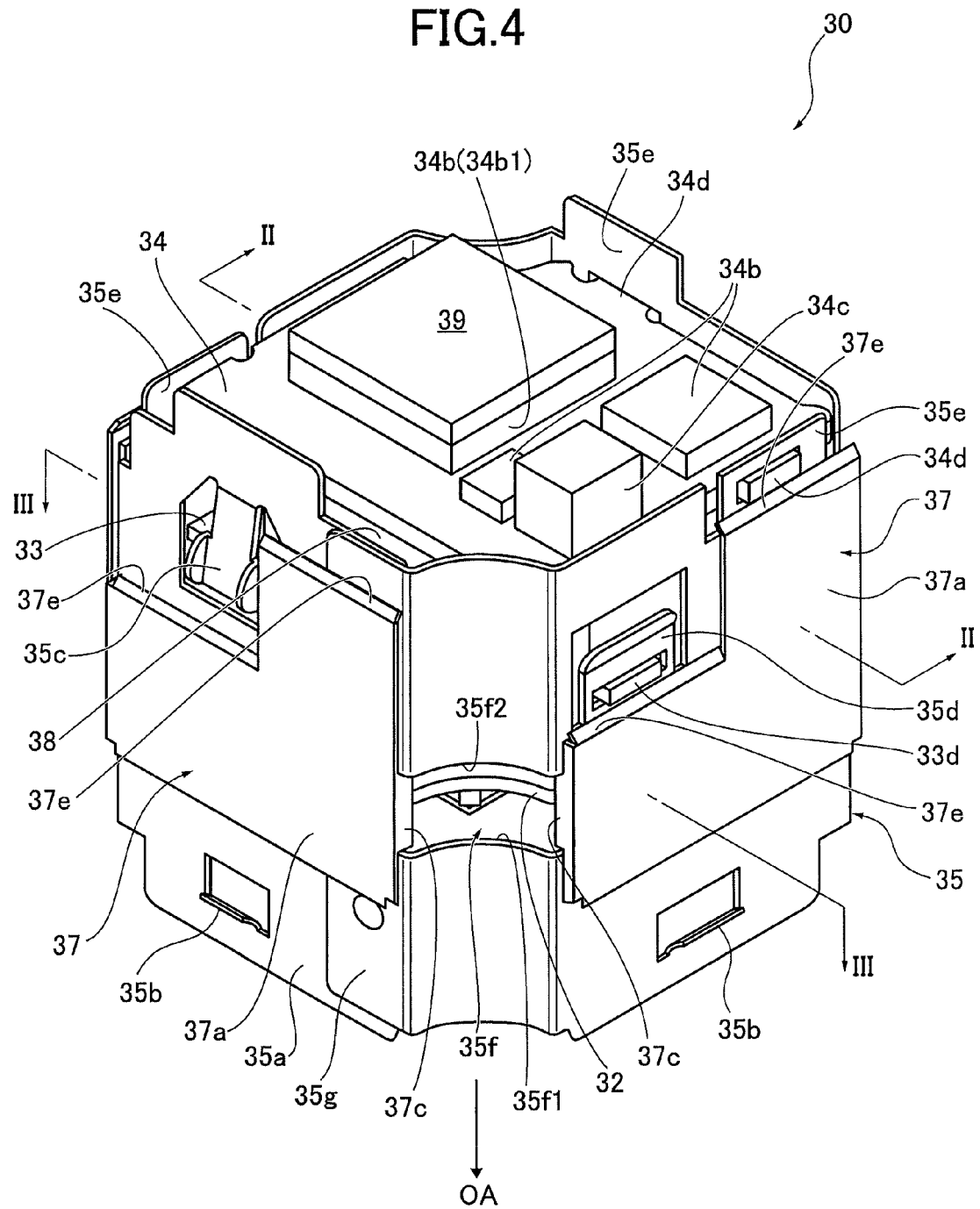
FIG. 4 is an explanatory view for describing a schematic configuration of an electronic circuit unit.
Figure 5:
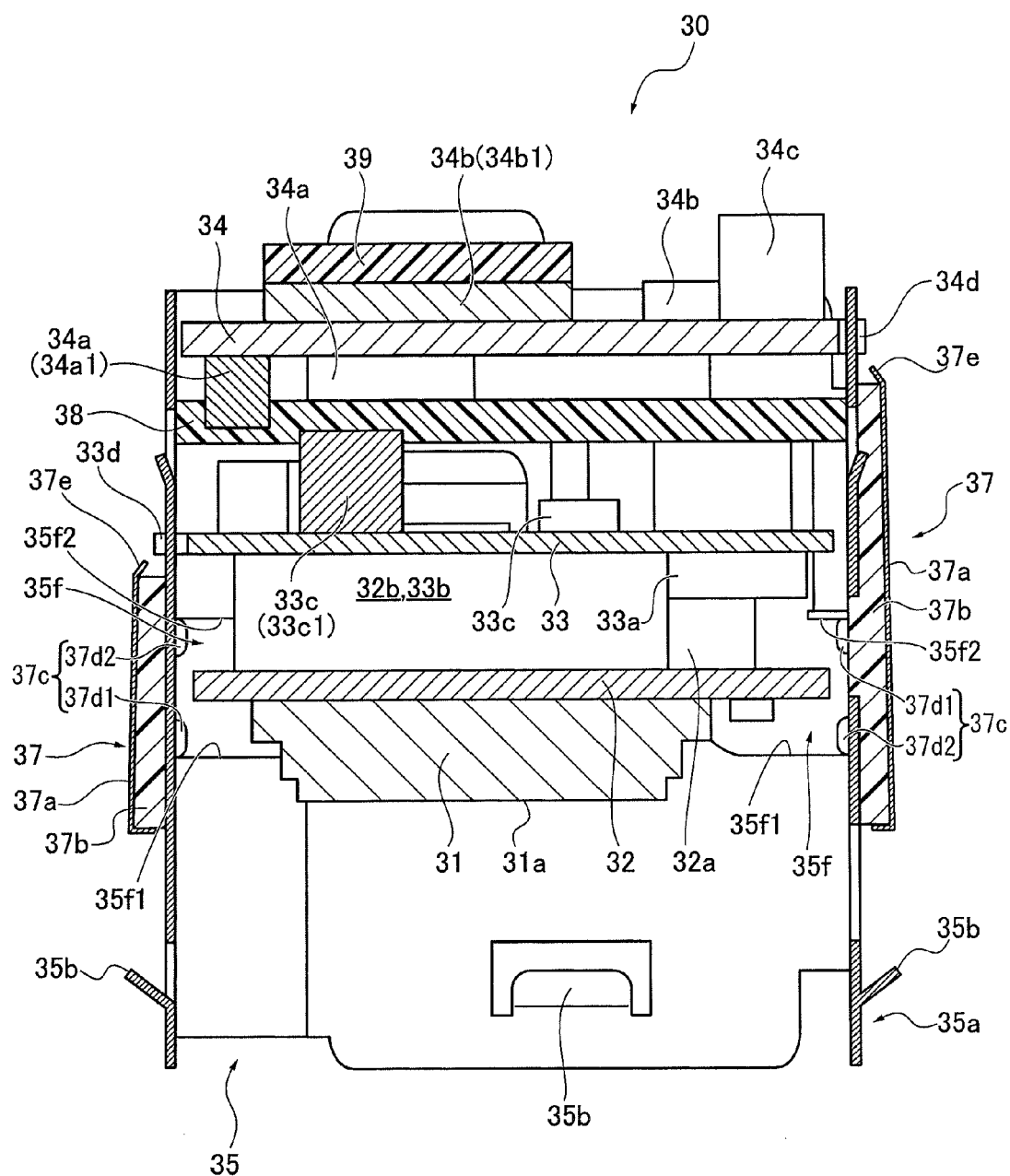
FIG. 5 is a schematic cross-sectional view of the electronic circuit unit taken along II-II line of FIG. 4.

As shown in FIGS. 3 to 5, the electronic circuit unit 30 includes the imaging device 31, the first board 32, a second board 33, a third board 34, and the shield case 35.

The imaging device 31 is a solid state imaging device such as a charge coupled device (CCD) image sensor or a sensor formed by using a complementary metal oxide semiconductor (CMOS) or the like, and is configured to convert an object image formed on a light receiving surface 31a through the imaging optical system 20 (optical element array 21) into electric signals (image data) and output the electric signals. The electric signals outputted from the imaging device 31 are generated in the form of digital image data corresponding to the object image and then outputted. In order to exhibit efficiently the optical performance set for the imaging optical system 20 (optical element array 21), the imaging device 31 is provided to the first board 32 at a given position relative to the imaging optical system 20 (the retaining hole 12a for retaining the imaging optical system 20). The position is so set that an object image formed by the imaging optical system 20 (optical element array 21) may be located properly on the light receiving surface 31 forming a substantial light receiving region.

Figure 6:
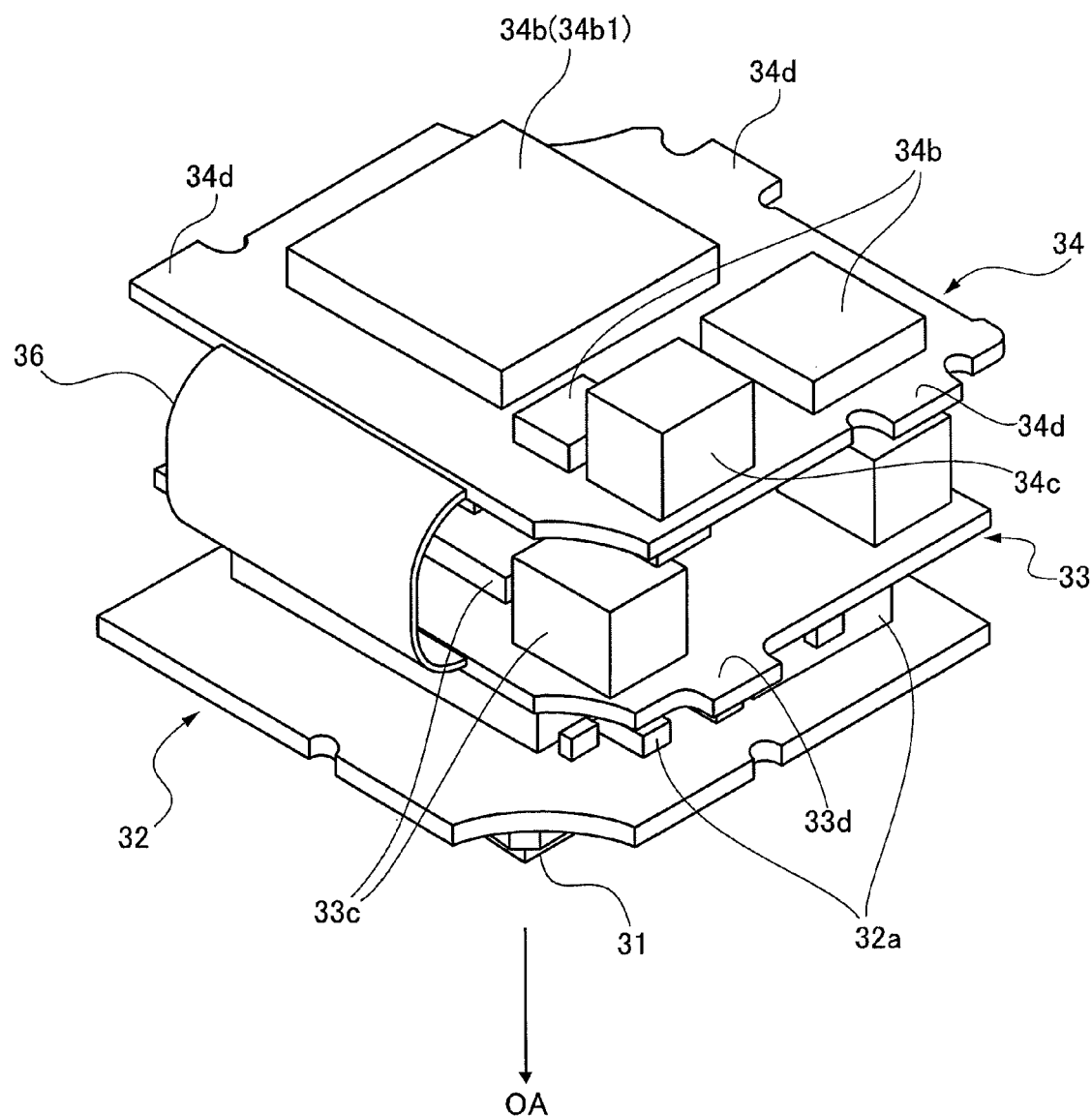
FIG. 6 is an explanatory view for describing configurations of boards of the electronic circuit unit.

As shown in FIGS. 3, 5, and 6, the first board 32 has a generally rectangular plate shape. The imaging device 31 is mounted on a front surface of the first board 32 on the object side, i.e., the imaging optical system 20 side, while electronic components 32a, such as a capacitor and a resistor, are mounted on a rear surface. The first board 32 is fixed to a rear end surface of each of the four supporting wall portions 12d of the front case part 12 with an unillustrated fixing member therebetween in a way to be substantially perpendicular to the imaging optical axis OA. A connector member 32b is provided to the rear surface of the first board 32. The second board 33 is provided at a rear side of the first board 32 (at a rear end side of the rear case part 13).

The second board 33 has a generally rectangular plate shape. Electronic components 33a, such as a capacitor and a resistor, and a connector member 33b are mounted on a front surface of the second board 33 on the object side, i.e., the imaging optical system 20 side, while electronic components 33c, such as a capacitor and a resistor, are mounted on a rear surface. The second board 33 is provided at a rear side of the first board 32 (at the rear end side of the rear case part 13) in a parallel configuration with the first board 32. With the connector member 33b being connected to the connector member 32b, the second board 33 is electrically connected to the first board 32. The second board 33 includes three projecting portions 33d (see FIG. 6 (only one is shown in FIG. 6)) which extend in the radial direction and are used for attachment to the shield case 35 as will be described later. Moreover, one end of a flexible printed board 36 is electrically connected to the second board 33 (see FIG. 6). The third board 34 is provided at a rear side of the second board 33 (at the rear end side of the rear case part 13).

The third board 34 has a generally rectangular plate shape. Electronic components 34a, such as a capacitor and a resistor, are mounted on a front surface of the third board 34 on the object side, i.e., the imaging optical system 20 side, while electronic components 34b, such as a capacitor and a resistor, and a connector member 34c are mounted on a rear surface. The third board 34 is provided at a rear side of the second board 33 (at the rear end side of the rear case part 13) in a parallel configuration with the second board 33. The connector member 34c allows an electrical connection between the third board 34 and the connecting cord 14 fixed to the rear end surface of the rear case part 13 by means of the connector portion 14a.

The third board 34 includes three projecting portions 34d (see FIG. 6) which extend in the radial direction and are used for attachment to the shield case 35 as will be described later. Moreover, the other end of the flexible printed board 36 is electrically connected to the third board 34 (see FIG. 6), so that the third board 34 is electrically connected to the second board 33. As described, in Embodiment 1, a space beside (in the radial direction) the second and third boards 33 and 34 is utilized to arrange the flexible printed board 36. Thus, the second and third boards 33 and 34 are each smaller in area than the first board 32 when viewed in the imaging optical axis OA direction (see FIG. 6).

The first, second, and third boards 32, 33, and 34 together form a predetermined electronic circuit with the electronic components 32a, 33a, 33c, 34a, and 34b provided thereto. This electronic circuit controls operations of the imaging device 31, generates digital image data corresponding to an object image on the basis of electric signals outputted from the imaging device 31, and does the like. The electronic circuit also converts the digital image data into signals of a predetermined type (e.g., national television system committee (NTSC) analog signals) and outputs the signals to the connecting cord 14. The configuration with the three layers of the boards 32, 33, and 34 as above is employed for the purpose of reducing the size of the imaging apparatus 10 while securing the required performance. Hence, it is possible to employ a structure with only one layer of board or multiple layers of board for forming the electronic circuit, and such structure may be set as appropriate in consideration of the number, sizes, shapes, and the like of components to be mounted. The shield case 35 is provided to surround the three electrically-connected boards 32, 33, and 34 arranged in parallel with each other in the imaging optical axis OA direction.

The shield case 35 forms an electromagnetic shield for preventing the release of an electromagnetic wave from the electronic circuit to its periphery and also for protecting the electronic circuit from being affected by an electromagnetic wave from the periphery. The shield case 35 is made of an electrically conductive material and electrically connected to a reference potential in the electronic circuit or to the ground level. In Embodiment 1, the shield case 35 is made of a metallic material and has a tubular shape which is substantially rectangle in a cross section perpendicular to the imaging optical axis OA. The shield case 35 has such a shape and a size that it can be fitted into the rear case part 13. As will be described later, in the imaging apparatus 10 of the present invention, heat transfer members (first heat transfer members 37) are designed to be in contact with outer peripheral surfaces of the electronic circuit unit 30, and therefore gaps are provided between outer surfaces of the shield case 35 and the inner peripheral wall surfaces of the peripheral wall portion 13b of the rear case part 13, respectively. For this reason, the shield case 35 has its outer peripheral surfaces formed in parallel with the imaging optical axis OA in the electronic circuit unit 30.

Figure 7:
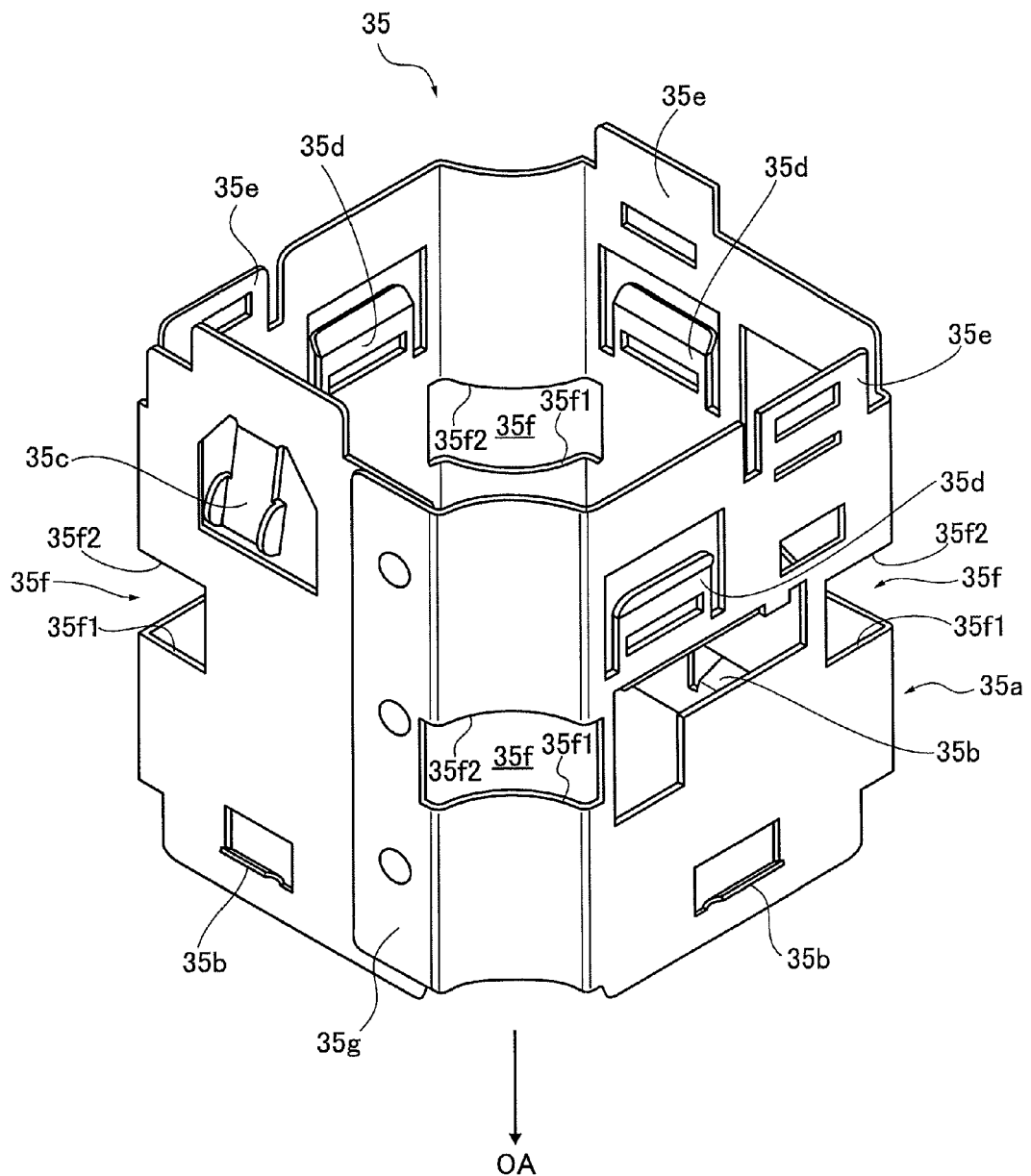
FIG. 7 is an explanatory view for describing a configuration of a shield case.

The shield case 35 includes pressing strips 35b (only three are shown in FIG. 7) provided respectively to four wall portions forming the base end portion 35a which serves as an attachment portion to the front case part 12. Each pressing strip 35b is made capable of pressing an inner wall surface of the annular fixing groove 12e in the front case part 12 when the base end portion 35a is inserted in the annular fixing groove 12e (see FIG. 3).

The shield case 35 also includes: a grounding contact strip 35c, three second-board supporting portions 35d, and three third-board supporting portions 35e near an end of the shield case 35 which appears as an upper end when FIG. 7 is viewed in the proper orientation (the rear side of the shield case 35 in the front-rear direction); and four positioning cutout portions 35f at middle positions. As will be described later, the grounding contact strip 35c is made capable of contacting an inner peripheral wall surface of the rear case part 13 (an inner side of the peripheral wall portion 13b) when the shield case 35 (electronic circuit unit 30) is housed in the rear case part 13, so as to make the potential of the rear case 13 equal to that of the shield case 35.

The second-board supporting portions 35d are provided at positions corresponding to the three projecting portions 33d of the second board 33, respectively, and are capable of receiving the corresponding projecting portions 33d to support them. Each second-board supporting portion 35d is formed by providing a through-hole for receiving the corresponding projecting portion 33d to a strip-shaped portion which is obtained by cutting out a part of a wall portion except for a front portion thereof in the imaging optical axis OA direction. A rear end portion of each second-board supporting portion 35d is bent outward in the radial direction. So, when the second board 33 is inserted inside the shield case 35 from a rear side thereof in the imaging optical axis OA direction, each second-board supporting portion 35d can be pressed and elastically deformed by the corresponding projecting portion 33d and then receive and support the projecting portion 33d by elastic return (i.e., snap-fit). Meanwhile, each second-board supporting portion 35d is prevented from being caught on the corresponding projecting portion 33d as it includes the bent portion at the rear end portion.

The third-board supporting portions 35e are provided at positions corresponding to the three projecting portions 34d of the third board 34, respectively, and are capable of receiving the corresponding projecting portions 34d to support them. Each third-board supporting portion 35e is formed by providing a through-hole for receiving the corresponding projecting portion 34d to a strip-shaped portion which is obtained by cutting out a part of the wall portion except for a front portion thereof in the imaging optical axis OA direction. So, when the third board 34 is inserted inside the shield case 35 from the rear side thereof in the imaging optical axis OA direction, each third-board supporting portion 35e can be pressed and elastically deformed by the corresponding projecting portion 34d and then receive and support the projecting portion 34d by elastic return (i.e., snap-fit).

The positioning cutout portions 35f are formed by cutting out the four wall portions constituting the shield case 35 in such a manner that the positioning cutout portions 35f extend over boundary portions of the four wall portions but only those of respective pairs of adjacent wall portions. Each positioning cutout portion 35f forms two engagement surfaces 35f1 and 35f2 extending perpendicularly to the front-rear direction (imaging optical axis OA direction) and facing each other in the direction. In Embodiment 1, the shield case 35 is formed by bending a metallic material of a flat-plate shape and formed into a tubular shape by joining together joining edge portions 35g located at circumferentially opposite ends of the metallic material. In Embodiment 1, the joining is performed by use of adhesive but may be performed by welding or fitting, for example. The first heat transfer members 37 are provided to the outer surfaces of the shield case 35, i.e., the outer peripheral surfaces of the electronic circuit unit 30 (see FIGS. 3, 4, and 5).

Figure 8:
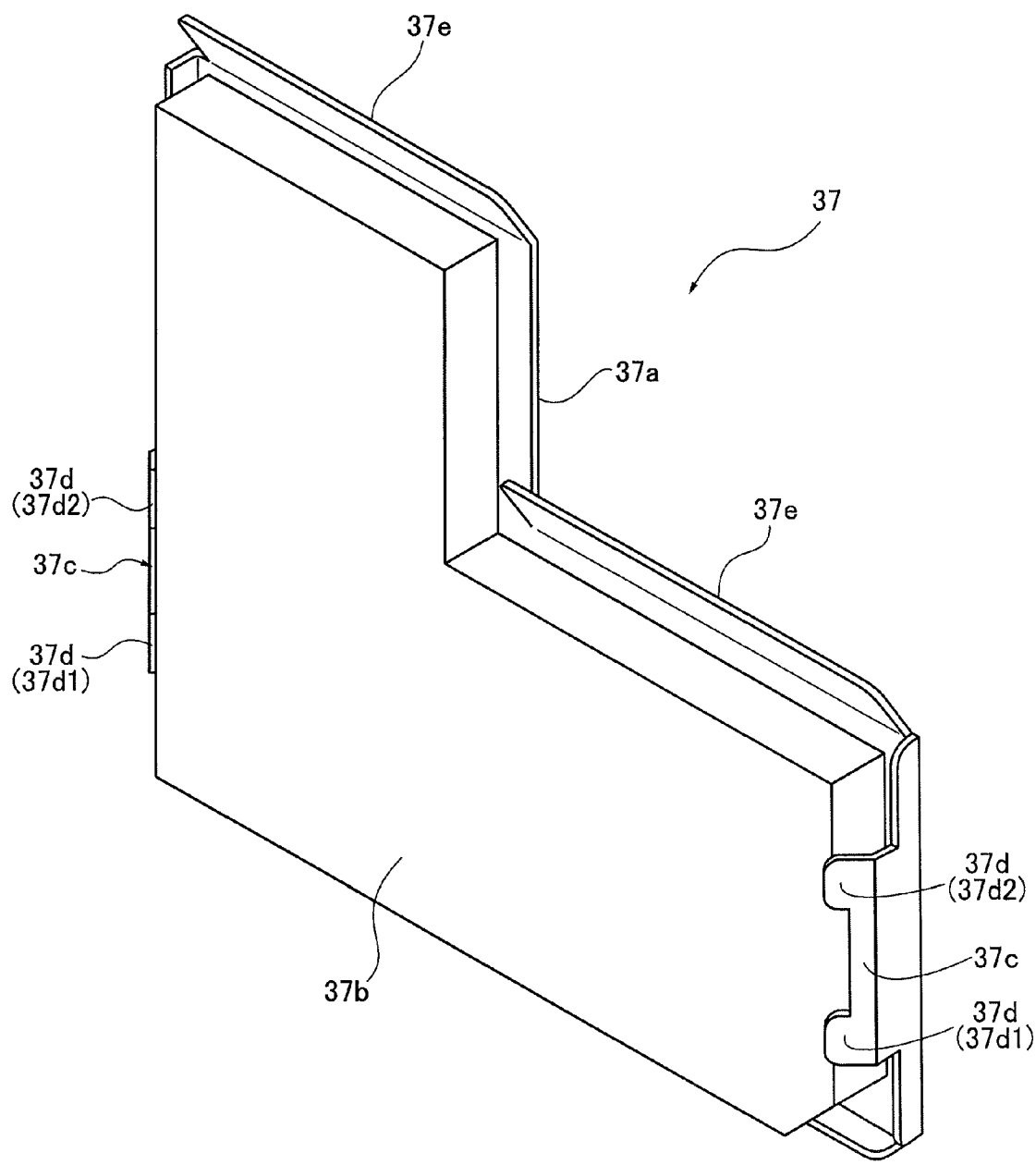
FIG. 8 is an explanatory view for describing a configuration of each first heat transfer member.

The first heat transfer members 37 joins the shield case 35 and the peripheral wall portion 13*b* of the rear case part 13 in the radial direction for the purpose of improving the thermal conductivity between the shield case 35 and the peripheral wall portion 13*b*. Each first heat transfer member 37 has a plate shape so to be able to be in surface contact with the corresponding outer surface of the shield case 35. In Embodiment 1, each first heat transfer member 37 has a generally L-shape as shown in FIG. 8. Each first heat transfer member 37 includes a metal plate portion 37*a* and a soft material portion 37*b*. The metal plate portion 37*a* is made of a metallic material excellent in thermal conductivity and is a generally thin, L-shaped plate.

To be excellent in thermal conductivity means at least to establish a later-described thermal connection to achieve a thermal conductivity higher than that in a case of interposing an air layer.

The metal plate portion 37*a* includes a pair of claw portions 37*c*. In a state where the first heat transfer member 37 is attached to the shield case 35, the two claw portions 37*c* are provided respectively at two end portions—in a direction perpendicular to the imaging optical axis OA direction—of the shield case 35 (see FIGS. 4, 5, etc). Each claw portion 37*c* includes a pair of projecting strips 37*d* aligned in the imaging optical axis OA direction and extending toward the axis of the shield case 35 (imaging optical axis OA). The sizes and positions of these two projecting strips 37*d* are set such that: one projecting strip 37*d*1 appearing at a lower position when FIG. 8 is viewed in the proper orientation may engage in the front-rear direction with one engagement surface 35*f*1 of the positioning cutout portion 35*f* appearing at a lower position when FIG. 7 is viewed in the proper orientation; and the other projecting strip 37*d*2 may engage in the front-rear direction with the other engagement surface 35*f*2 of the positioning cutout portion 35*f*. Moreover, the metal plate portion 37*a* includes inclined wall portions 37*e* at its rear end portions (appearing as upper end portions when FIG. 8 is viewed in the proper orientation). These inclined wall portion 37*e* are formed by bending the metal plate portion 37*a* in a direction to attach the metal plate portion 37*a* to the shield case 35, i.e., toward the soft material portion 37*b*.

The soft material portion 37*b* is made of a soft material being excellent in thermal conductivity and is a generally thin, L-shaped plate. Here, being soft means that shape conformability is excellent, i.e., the material's surface shape can be easily deformed in conformity with the shape of a contact portion and brought into tight contact with the contact portion when the material is pressed against the contact potion so that the contact area can be easily secured. In Embodiment 1, the soft material portion 37*b* is made of a silicone gel excellent in thermal conductivity and has adhesibility in addition to the aforementioned shape conformability (elasticity). Each first heat transfer member 37 is configured such that the soft material member 37*b* is pressed against the metal plate portion 37*a* in a region between both claw portions 37*c*. The soft material portion 37*b* is in tight contact with the metal plate portion 37*a* due to the shape conformability of the soft material portion 37*b* and adheres to the metal plate portion 37*a* by the adhesive force of the soft material portion 37*b*. As will be described later, the soft material portion 37*b* is set to have a thickness which makes the thickness of the first heat transfer member 37 larger than a gap formed between the outer peripheral surface of the electronic circuit unit 30 and the peripheral wall portion 13*b* (inner peripheral wall surface) of the rear case part 13 in a state where the electronic circuit unit 30 is fitted in the rear case part 13.

Figure 9:
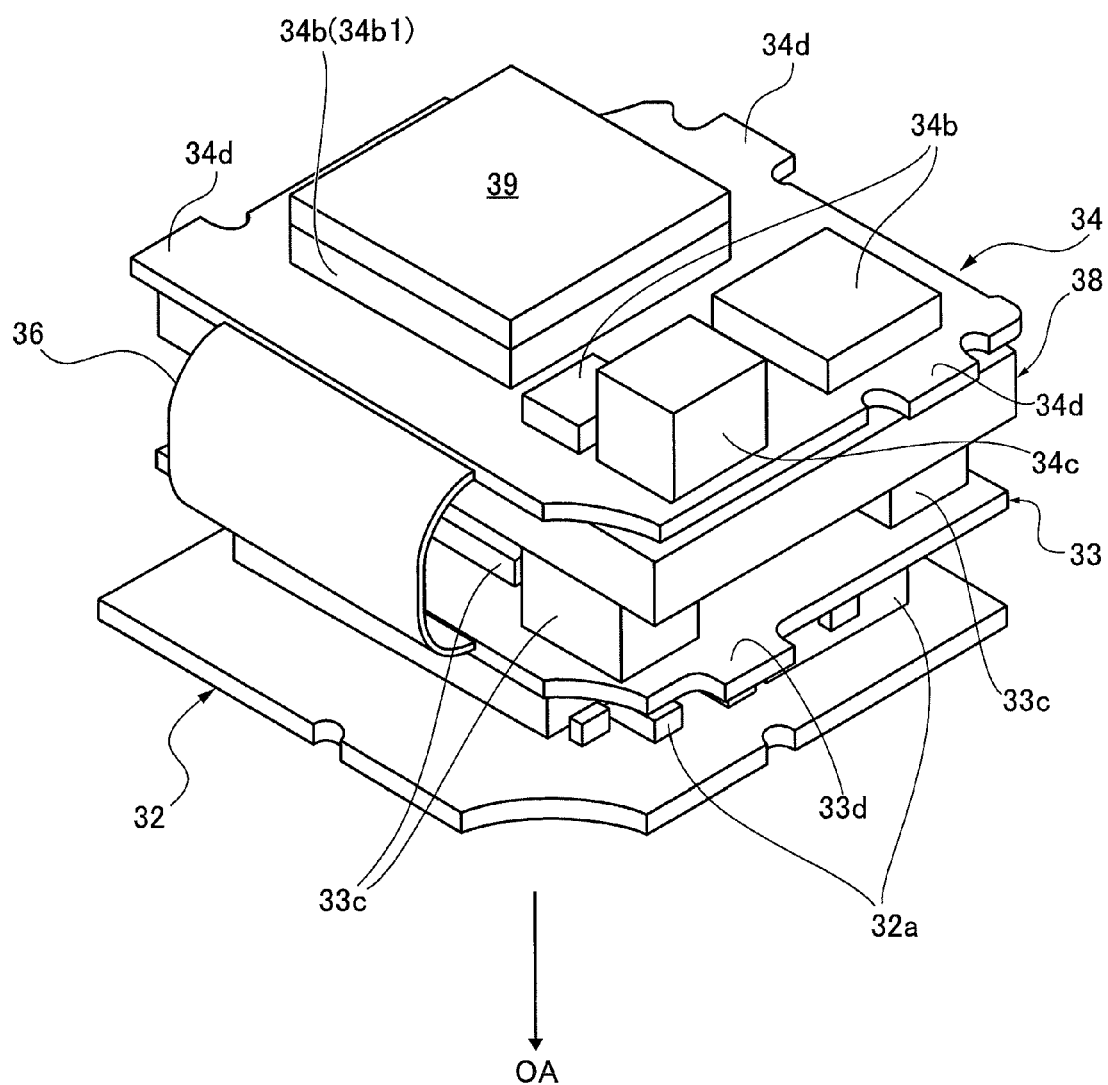
FIG. 9 is an explanatory view for describing how a second heat transfer member and a third heat transfer member are provided to some of the boards of the electronic circuit unit.
Figure 10:
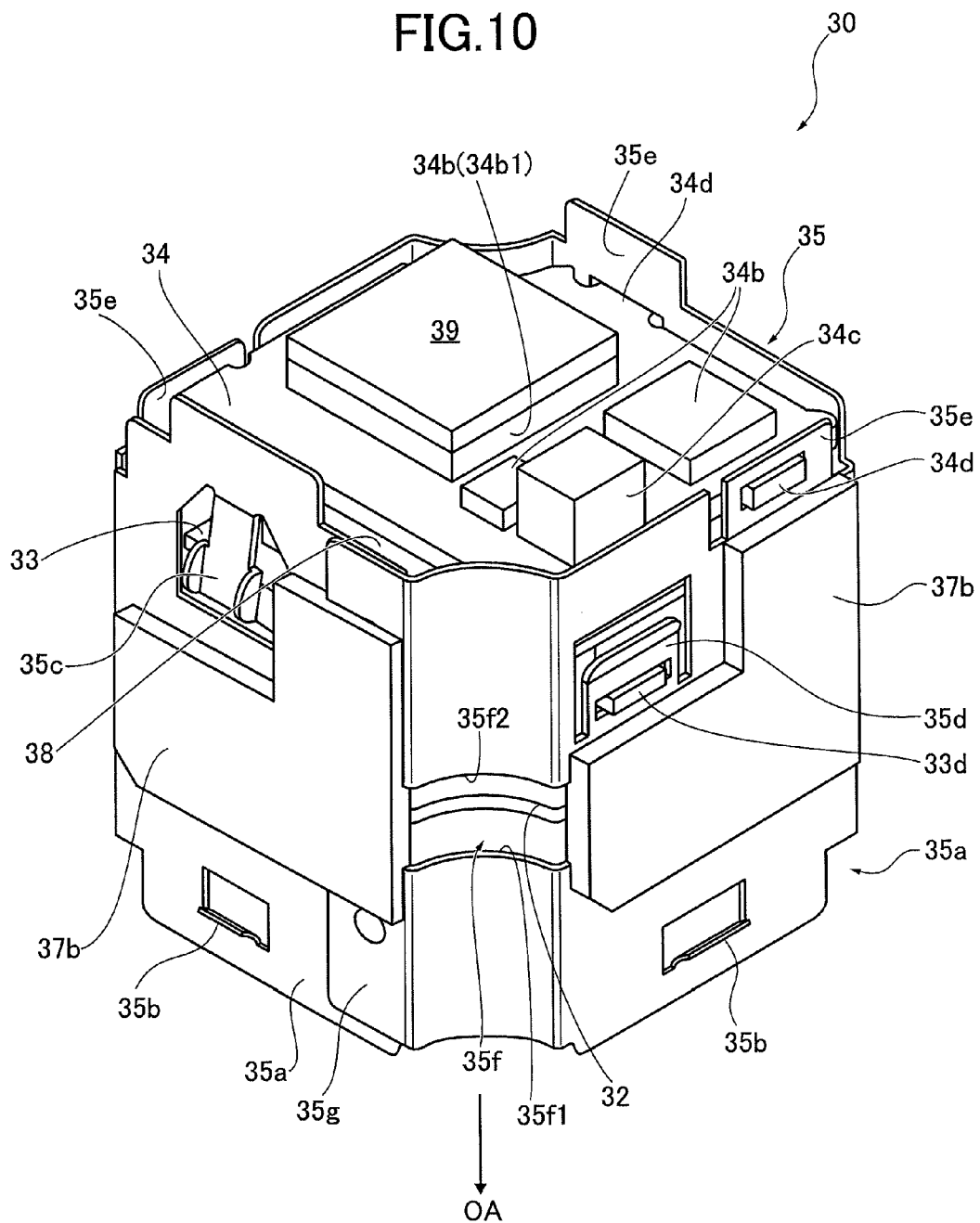
FIG. 10 is an explanatory view for describing how a soft member is disposed on each first heat transfer member provided to an outer peripheral surface of the electronic circuit unit.
Figure 11:
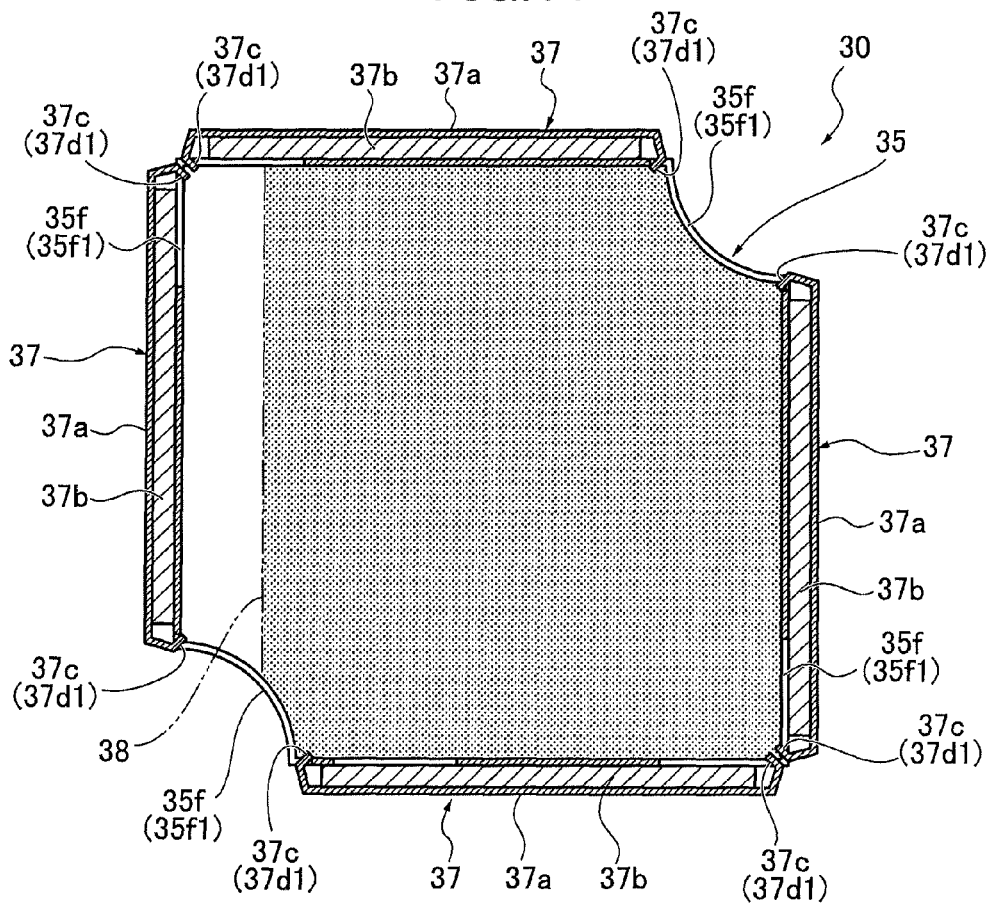
FIG. 11 is a schematic cross-sectional view of the electronic circuit unit taken along line of FIG. 4.

Moreover, in the electronic circuit unit 30 of Embodiment 1, a second heat transfer member 38 is provided between the second and third boards 33 and 34 (see FIG. 9). This second heat transfer member 38 joins the shield case 35 and the electronic components mounted on the boards (32, 33, and 34) in the radial direction for the purpose of improving the thermal conductivity between the shield case 35 and the electronic components. In Embodiment 1, the second heat transfer member 38 is provided between the second and third boards 33 and 34 to join the shield case 35 and the electronic components 33*c* mounted on the rear surface of the second board 33 and the electronic components 34*a* mounted on the front surface of the third board 34. The second heat transfer member 38 is made of a soft material excellent in thermal conductivity, which is the same as the soft material portion 37*b* of the first heat transfer member 37, and has a generally thin plate shape. In Embodiment 1, the second heat transfer member 38 is made of a silicone gel excellent in thermal conductivity and has the shape conformability and adhesibility mentioned above.

In Embodiment 1, the second heat transfer member 38 is brought into contact with only a desired electronic component 33*c*1 out of the electronic components 33*c* of the second board 33, and also only a desired electronic component 34*a*1 out of the electronic components 34*a* of the third board 34. Those selected electronic components are ones with larger amounts of heat genereation. The aforementioned selective contact can be achieved by simply forming the second heat transfer member 38 into a plate shape extending along the boards, in a case where the desired electronic components are higher in height than the other electronic components. On the other hand, in a case where the desired electronic components are the same in size as the other electronic components or lower in height, it is possible to provide the second heat transfer member 38 with through-holes or recessed portions to avoid contact with the other electronic components, or to provide the second heat transfer member 38 with raised portions to allow contact with the desired electronic components.

As shown in FIG. 9, the second heat transfer member 38 has such a size that, in a view seen in the imaging optical axis OA direction, it extends outward beyond lateral surfaces along three sides of each of the second board 33 (except the projecting portions 33*d*) and the third board 34 (except the projecting portions 34*d*) except lateral surfaces along the remaining one side between which the flexible printed board 36 is laid in the imaging optical axis OA direction. In other words, the size of the second heat transfer member 38 on a plane perpendicular to the imaging optical axis OA is set such that its three lateral surfaces are beyond the second and third boards 33 and 34. Moreover, the second heat transfer member 38 has a size that is large enough for its three lateral surfaces to be in contact with inner surfaces of the shield case 35, respectively (see FIGS. 3 and 5).

Further, in the electronic circuit unit 30 of Embodiment 1, a third heat transfer member 39 is provided to one of the electronic components 34*b* mounted on the rear surface of the third board 34. This third heat transfer member 39 joins the corresponding electronic component 34*b* and the bottom wall portion 13*a* of the rear case part 13 for the purpose of improving the thermal conductivity between the electronic component 34*b* and the bottom wall portion 13*a*. The third heat transfer member 39 is made of a soft material excellent in thermal conductivity, which is the same as the soft material portion 37*b* of the first heat transfer member 37 and the second heat transfer member 38, and has a generally thin plate shape. In Embodiment 1, the third heat transfer member 39 is made of a silicone gel being excellent in thermal conductivity and has the shape conformability and adhesibility mentioned above. The third heat transfer member 39 has a substantially same size as the corresponding electronic component 34b in the view seen in the imaging optical axis OA direction. Moreover, as will be described later, the third heat transfer member 39 has such a size that it may be compressed between the electronic component 34b and the bottom wall portion 13a (inner wall surface thereof) when the electronic circuit unit 30 is housed in the rear case part 13 (see FIG. 3).

Next, an assembly procedure for the aforementioned imaging apparatus 10 will be described.

First, in the imaging apparatus 10, the optical element array 21 is inserted into the retaining hole 12a in the front case part 12 as mentioned above. Then, in the front case part 12, the fall prevention member 22 is screwed to the threaded groove 12c with the sealing member 23 disposed in the annular sealing groove 12b, so that the imaging optical system 20 is retained by the front case part 12. As mentioned above, the engagement appropriately compresses the sealing member 23 and therefore prevents the intrusion of water, dust, and the like between the front case part 12 and the imaging optical system 20 (lens 21a) from the outer surface S of the front case part 12. Accordingly, a sufficient sealing performance is achieved (see FIG. 3).

Next, the imaging device 31 and the electronic components 32a are mounted on the first board 32, and the first board 32 is positioned such that the imaging device 31 may be in focus with respect to the imaging optical system 20. The positioned first board 32 is fixed to the four supporting wall portions 12d of the front case part 12 with the aforementioned unillustrated fixing member.

Next, the joining edge portions 35g are joined together to form the tubular shield case 35. The base end portion 35a of the shield case 35 is inserted into the annular fixing groove 12e in the front case part 12. Here, inside the annular fixing groove 12e, the pressing strips 35b provided to the base end portion 35a of the shield case 35 press the inner wall surface of the annular fixing groove 12e, so that the base end portion 35a is fitted in the annular fixing groove 12e (see FIG. 3).

Next, the electronic components 33a, the connector member 33b, and the electronic components 33c are mounted on the second board 33; the electronic components 34a, the electronic components 34b, and the connector member 34c are mounted on the third board 34; and the second and third boards 33 and 34 are electrically connected by the flexible printed board 36.

Next, the second board 33 is inserted into the shield case 35, and the connector member 33b is connected to the connector member 32b of the first board 32 supported by the front case part 12. After that, the second board 33 is pressed in the imaging optical axis OA direction to fit the three projecting portions 33d of the second board 33 into the corresponding second-board supporting portions 35d of the shield case 35 (see FIG. 10), and then the second heat transfer member 38 is disposed on the second board 33 (see FIG. 9). Thereafter, the third board 34 is inserted into the shield case 35 to fit the three projecting portions 34d into the corresponding third-board supporting portions 35e of the shield case 35 (see FIG. 10).

In this event, the second heat transfer member 38 is pressed against the desired electronic component 33c1 of the electronic components 33c of the second board 33 and the desired electronic component 34a1 of the electronic components 34a of the third board 34 (see FIG. 5). The second heat transfer member 38 is appropriately disposed in the tubular shield case 35, and the aforementioned three lateral surfaces of the second heat transfer member 38 are in contact with the inner surfaces of the shield case 35 (see an area in FIG. 11 indicated by reference sign 38 and illustrated with a two-dot chain line and dots). Thus, the second heat transfer member 38 joins the electronic components 33c1 and 34a1 and the shield case 35 in the radial direction.

When the second and third boards 33 and 34 are housed inside the shield case 35, the shield case 35 is electrically connected to the reference potential in the electronic circuit formed by the electronic components mounted on the boards (including the first board 32), or to the ground level. In Embodiment 1, though not illustrated, a connecting line to the reference potential provided to each of the second and third boards 33 and 34 is electrically connected to the shield case 35.

As a result, the boards (32, 33, and 34) form a desired electronic circuit including the imaging device 31, thereby forming the electronic circuit unit 30 surrounded by the shield case 35 (in this example, the second heat transfer member 38 is provided and attached to the front case part 12).

Next, the four first heat transfer members 37 are attached to the outer peripheral surfaces of the electronic circuit unit 30, i.e., the outer surfaces of the shield case 35, respectively (see FIGS. 4 and 5). The soft material portion 37b of each first heat transfer member 37 is pressed against the corresponding outer surface of the shield case 35 (see FIG. 10), so that the first heat transfer member 37 is attached to the outer surface by the adhesive force of the soft material portion 37b. In this event, the paired claw portions 37c of the metal plate portion 37a of each first heat transfer member 37 are inserted into the two positioning cutout portions 35f located at both ends of the corresponding attachment region, respectively (see FIGS. 4, 5, 11, etc.). As mentioned above, in each positioning cutout portion 35f, the one projecting strip 37d1 of the two projecting strips 37d of the claw portion 37c appearing at a lower position when FIG. 8 is viewed in the proper orientation engages in the front-rear direction with the one engagement surface 35f1 of the positioning cutout portion 35f appearing at a lower position when FIG. 7 is viewed in the proper orientation and the other projecting strip 37d2 engages in the front-rear direction with the other engagement surface 35f2 of the positioning cutout portion 35f (see FIG. 5). Accordingly, each first heat transfer member 37 is positioned in the front-rear direction (imaging optical axis OA direction) with respect to the shield case 35 and is also prevented from being displaced from the shield case 35 in the vertical direction. In Embodiment 1, since the front-rear direction is the direction to fit the electronic circuit unit 30 into the rear case part 13, each positioning cutout portion 35f (engagement surfaces 35f1 and 35f2) of the shield case 35 and each claw portion 37c (both projecting strips 37d) of each first heat transfer member 37 function as positioning engagement portions which allow engagement while preventing relative displacement in the fitting direction of the insertion.

Next, the third heat transfer member 39 is pressed against the desired electronic component 34b1 of the electronic components 34b mounted on the rear surface of the third board 34 of the electronic circuit unit 30 (see FIGS. 3, 9, etc.). The third heat transfer member 39 is attached to the electronic component 34b1 by its adhesive force.

Next, the connecting cord 14 is sealingly connected to the rear case part 13. After that, the connector member 34c of the third board 34 of the electronic circuit unit 30 attached to the front case part 12 is electrically connected to the connecting cord 14 (connector portion 14a) attached to the rear case part 13.

Next, the electronic circuit unit 30 equipped with the four first heat transfer members 37, the second heat transfer member 38, and the third heat transfer member 39 and attached to the front case part 12 is inserted relatively into the rear case part 13 along the imaging optical axis OA. Here, although the first heat transfer members 37 are provided respectively to the outer peripheral surfaces of the electronic circuit unit 30 (shield case 35), the slidability of the first heat transfer members 37 and the inner peripheral wall surfaces of the peripheral wall portion 13*b* of the rear case part 13 made of an aluminum alloy is secured because the metal plate portion 37*a* formed of a metallic material is located on the outer side of each first heat transfer member 37. Accordingly, the electronic circuit unit 30 can be inserted relatively into the rear case part 13 easily. Specifically, in Embodiment 1, the inclined wall portions 37*e* (see FIG. 8) provided to the rear end portions of the metal plate portion 37*a* of each first heat transfer member 37 prevent the rear end portions of the first heat transfer member 37 from being caught on an end portion of the opening in the rear case part 13 (an end portion of the peripheral wall portion 13*b*). Accordingly, the electronic circuit unit 30 can be inserted relatively into the rear case part 13 easily.

As the electronic circuit unit 30 is inserted relatively into the rear case part 13, the soft material portions 37*b* of the first heat transfer members 37 are appropriately compressed, so that the first heat transfer members 37 are fitted between the outer surfaces of the shield case 35 and the inner peripheral wall surfaces of the peripheral wall portion 13*b* of the rear case part 13. As a result, the electronic circuit unit 30 equipped with the first heat transfer members 37 is fitted in the rear case part 13. After fitting the electronic circuit unit 30 as described, the front and rear case parts 12 and 13 are sealingly coupled to each other. By the above procedure, the imaging apparatus 10 (see FIG. 3) is assembled which has a waterproof function and a dustproof function provided for the back surface side of the front case part 12 by the case 11 to prevent the intrusion of water and dust into the imaging optical system 20 and the electronic circuit unit 30 from the outside. It should be noted that the assembly procedure is not limited to that of Embodiment 1.

The imaging apparatus 10 can be attached to a desired position via both attachment protrusions 13*c* of the rear case part 13. Though not illustrated, the imaging apparatus 10 may be, for example, installed around the bumper or license plate on a rear part of a vehicle or the like spot to be used as an in-vehicle camera mounted to capture images of a space behind the vehicle. Here, though not illustrated, a configuration may be employed in which the images acquired by the imaging apparatus 10 are displayed on a monitor serving as a display of a navigation system. By this configuration, an occupant, or a driver in particular, can check the images of the space behind the vehicle acquired by the imaging apparatus 10 from the inside of the cabin of the vehicle through the monitor.

As described, in the imaging apparatus 10, the imaging optical system 20 and the electronic circuit unit 30 are housed in the case 11 having a generally small configuration and a sealing performance in all directions. Moreover, in the imaging apparatus 10, the electronic components 33*c*1 and 34*a*1 mounted respectively on the second and third boards 33 and 34 are connected to the shield case 35 through the second heat transfer member 38 which is disposed between the second and third boards 33 and 34 while extending along both of these boards. The shield case 35 is connected to the peripheral wall portion 13*b* (inner peripheral wall surfaces) of the rear case part 13 through the four first heat transfer members 37 provided to the outer surfaces of the shield case 35. That is, the electronic components 33*c*1 and 34*a*1 are thermally connected to the rear case part 13 by the second heat transfer member 38, the shield case 35, and the first heat transfer members 37. Here, to be thermally connected means to achieve direct contact or contact with a highly thermally conductive member in between, i.e., to interpose no air layer.

Moreover, in the imaging apparatus 10, the electronic component 34*b*1 mounted on the third board 34 is connected to the inner wall surface of the bottom wall portion 13*a* of the rear case part 13 in a state where the third heat transfer member 39 pressed against the electronic component 34*b*1 is interposed in between. That is, the electronic component 34*b*1 is thermally connected to the bottom wall portion 13*a* of the rear case part 13 by the third heat transfer member 39 disposed between the electronic component 34*b*1 and the bottom wall portion 13*a* of the rear case part 13.

Furthermore, in the imaging apparatus 10, the grounding contact strip 35*c* of the shield case 35 is in contact with the inner peripheral wall surface of the peripheral wall portion 13*b* of the rear case part 13, so that the rear case part 13, i.e., the case 11, and the shield case 35 are set at the equal potential. The shield case 35 is electrically connected to the reference potential in the predetermined electronic circuit formed by the electronic components mounted on the boards, and therefore the rear case part 13 is set at the reference potential as well.

In the imaging apparatus 10 of Embodiment 1, the outer surfaces of the electronic circuit unit 30 are connected to the peripheral wall portion 13*b* of the rear case part 13 through the four first heat transfer members 37. Thus, heat generated in the electronic circuit unit 30 can be transferred to and dissipated from the peripheral wall portion 13*b* of the rear case part 13, whereby the heat can be dissipated (released) efficiently. This is because: the outer peripheral surfaces of the electronic circuit unit 30 are in contact with the peripheral wall portion 13*b* of the rear case part 13 through the four first heat transfer members 37 and are therefore thermally connected to the peripheral wall portion 13*b* of the rear case part 13 with no air layer interposed therebetween; and the peripheral wall portion 13*b* of the rear case part 13 is used as spots to dissipate the heat. Accordingly, the imaging apparatus 10 can prevent increase in the temperature of the electronic circuit unit 30, thereby securing the performance of the electronic circuit unit 30.

Moreover, in the imaging apparatus 10, the electronic circuit unit 30 and the four first heat transfer members 37 adhere to each other by the soft material portions 37*b* pressed against the outer surfaces of the shield case 35 and inner surfaces of the metal plate portions 37*a*. Thus, tight contact can be secured between the shield case 35 and the soft material portions 37*b* and between the soft material portions 37*b* and the metal plate portions 37*a*.

Accordingly, thermal conductivity can be improved between the shield case 35 and the first heat transfer members 37. This is because the contact area can be secured easily due to the excellent shape conformability of each soft material portion 37*b* which allows the soft material portion 37 to easily deform its surface shape in conformity with the shape of a contact portion and come in tight contact with the contact portion when the soft material portion 37 is held (pressed) against the contact potion. Thus, regardless of the surface shapes of the outer peripheral surfaces of the electronic circuit unit 30—in Embodiment 1, the shapes of the outer surfaces of the shield case 35—the soft material portions 37*b* can be brought into tight contact with the outer surfaces of the shield case 35 (see FIGS. 5, 10, and 11). This makes it possible to achieve a fine heat dissipation performance even when features in the design of the shield case 35 (electronic circuit unit 30) for improving the heat dissipation performance are reduced. Accordingly, the design freedom of the shield case (electronic circuit unit 30) can be improved.

Furthermore, the imaging apparatus 10 is configured such that the four first heat transfer members 37 and the peripheral wall portion 13b of the rear case part 13 are in contact with each other at the metal plate portions 37a made of a metallic material and the inner peripheral wall surfaces of the peripheral wall portion 13b of the rear case part 13. Thus, the slidability of the first heat transfer members 37 and the peripheral wall portion 13b of the rear case part 13 is secured for the relative insertion of the electronic circuit unit 30 into the rear case part 13. This makes it possible to make the work of housing the electronic circuit unit 30 into the rear case part 13 simple while achieving a desired contact state of each first heat transfer member 37 with the electronic circuit unit 30, i.e., a desired positional relationship between the contact portions and a desired tight contact therebetween. Accordingly, the heat dissipation performance can be achieved as intended.

In the imaging apparatus 10, each of the four first heat transfer members 37 located between the electronic circuit unit 30 and the peripheral wall portion 13b (inner peripheral surfaces) of the rear case part 13 is such that the metal plate portion 37a is pressed toward the peripheral wall portion 13b of the rear case part 13 by the return force of the elastic soft material portion 37b. Thus, the tightness of contact can be increased between the metal plate portion 37a and the inner peripheral surface of the peripheral wall portion 13b of the rear case part 13. Accordingly, thermal conductivity can be improved between the first heat transfer members 37 and the peripheral wall portion 13b of the rear case part 13.

In the imaging apparatus 10, the electronic circuit unit 30 is such that the electronic components 33c1 and 34a1 mounted respectively on the second and third boards 33 and 34 are connected to the shield case 35 through the second heat transfer member 38. Thus, heat generated in the electronic components 33c1 and 34a1 can be transferred efficiently to the shield case 35 forming the outer peripheral surfaces of the electronic circuit unit 30. The outer peripheral surfaces of the electronic circuit unit 30, i.e., the outer surfaces of the shield case 35 are connected to the peripheral wall portion 13b of the rear case part 13 through the four first heat transfer members 37. Thus, the heat generated in the electronic components 33c1 and 34a1 can be transferred dissipated (released). Accordingly, the imaging apparatus 10 can efficiently prevent increase in the temperature of the electronic circuit unit 30, thereby securing the performance of the electronic circuit unit 30.

In the imaging apparatus 10, the generally thin, flat plate-shaped second heat transfer member 38 is provided between the second and third boards 33 and 34. Thus, the heat of the electronic components 33c1 and 34a1 sandwiched between the second and third boards 33 and 34 can be transmitted in the radial direction (the direction perpendicular to the imaging optical axis OA). The heat can be then transmitted from the first heat transfer members 37 provided to the outer peripheral surfaces of the electronic circuit unit 30 to the peripheral wall portion 13b of the rear case part 13 and dissipated from the peripheral wall portion 13b. In the imaging apparatus 10, since the generally thin, flat plate-shaped second heat transfer member 38 is provided appropriately between the boards arranged in parallel with each other in the imaging optical axis OA direction as described above, the heat of the electronic components provided between those boards can be dissipated efficiently.

In the imaging apparatus 10, the second heat transfer member 38 is made of a member being thermally conductive and excellent in shape conformability, thus suppressing force which is applied to the electronic components 33c1 and 34a1 on the second and third boards 33 and 34 as a result of the contact of the second heat transfer member 38 with the electronic components 33c1 and 34a1. This makes it possible to secure tight contact with the electronic components 33c1 and 34a1 without losing the reliability of the electronic circuit. Accordingly, thermal conductivity can be improved between the electronic components 33c1 and 34a1 and the shield case 35.

In the imaging apparatus 10, the second heat transfer member 38 is made in contact with only the electronic components 33c1 and 34a1 on the second and third board 33 and 34. Thus, the heat of the electronic components 33c1 and 34a1 can be transferred efficiently to the shield case 35 while being prevented from being transferred to the other electronic components (33c and 34a). Specifically, when the second heat transfer member 38 is made of a soft material excellent in thermal conductivity as in Embodiment 1, the second heat transfer member 38 can be easily made in selective contact with those electronic components on the boards which generate high heat. Accordingly, the heat can be dissipated more efficiently and appropriately, making it possible to more appropriately prevent increase in the temperature of the electronic circuit unit 30.

In the imaging apparatus 10, the paired claw portions 37c are provided to the metal plate portion 37a of each first heat transfer member 37, and the two projecting strip 37d of both claw portions 37c are engaged in the front-rear direction with the corresponding positioning cutout portion 35f. Thus, each first heat transfer member 37 can be prevented from being displaced from the shield case 35 in the front-rear direction. That is, the engagement between the positioning engagement portions can help prevent the displacement between the electronic circuit unit 30 and the first heat transfer members 37 in the front-rear direction. This makes it possible to securely maintain a desired contact state of each first heat transfer member 37 with the electronic circuit unit 30 when the electronic circuit unit 30 is fitted relatively into the rear case part 13. Accordingly, the heat dissipation performance can be achieved as intended.

In the imaging apparatus 10, the paired claw portions 37c are provided to the metal plate portion 37a of each first heat transfer member 37, and the two projecting strip 37d of both claw portions 37c are engaged in the front-rear direction with the corresponding positioning cutout portion 35f. Thus, each first heat transfer member 37 is positioned in the front-rear direction with respect to the shield case 35. Accordingly, each first heat transfer member 37 can be attached easily yet appropriately to the shield case 35 (electronic circuit unit 30).

In the imaging apparatus 10, the inclined wall portions 37e are provided to the rear end portions of the metal plate potion 37a of each first heat transfer member 37. Thus, the rear end portions of the first heat transfer member 37 are prevented from being caught on the end portion of the opening in the rear case part 13 (the end portion of the peripheral wall portion 13b). Accordingly, the electronic circuit unit 30 can be inserted relatively into the rear case part 13 more easily.

In the imaging apparatus 10, the electronic circuit unit 30 can be housed in the box-shaped rear case part 13 with one end open while the first heat transfer members 37 are interposed appropriately therebetween. Thus, an appropriate heat dissipation performance can be achieved, and the sealing performance of the case 11 can be easily secured as well. This is due to the following reason: in the case of the configuration of the present invention in which the electronic circuit unit 30 is housed in the box-shaped rear case part 13 with one end open, and the front case part 12 in which sealability is already secured is attached to the open end, sealability needs to be secured only between the open end of the rear case part 13 and the front case part 12. Accordingly, a secure sealing performance can be achieved with a simple configuration. Here, by forming each first heat transfer member 37 with the metal plate portion 37$a$ and the soft material portion 37$b$, the imaging apparatus 10 of the present invention can solve the problem in the tightness of contact between the heat transfer member and the electronic circuit unit 30 and between the heat transfer member and the rear case part 13, as well as the problem in the slidability in the relative fitting of the electronic circuit unit 30 equipped with the heat transfer member on the outer peripheral surface into the rear case part 13. Accordingly, the configuration is such that the electronic circuit unit 30 with the first heat transfer members 37 attached thereto is fitted into the rear case part 13 which is a box-shaped housing member with one end open and thereby housed therein. Alternatively, to solve the problem in the slidability in the fitting, the rear case part for housing the electronic circuit unit 30 may be formed by assembling multiple members so that the above-mentioned relative insertion itself can be omitted. In this case, however, sealability needs to be secured between the multiple members individually, and thus the configuration becomes complicated. The complicated configuration impedes the downsizing of the imaging apparatus and makes it difficult to achieve a secure sealing performance. As compared to this, the imaging apparatus 10 of the present invention can easily achieve an appropriate heat dissipation performance and secure a sealing performance in the case 11.

In the imaging apparatus 10, the shield case 35 is electrically connected to the reference potential in the predetermined electronic circuit formed of the electronic components mounted on the boards. Thus, an electromagnetic shield for the electronic circuit unit 30 can be formed. Accordingly, it is possible to prevent the release of an electromagnetic wave from the electronic circuit to its periphery and also to protect the electronic circuit from being affected by an electromagnetic wave from the periphery. That is, the shield case 35 functions as an electromagnetic shield while functioning as a heat transfer member for dissipating the heat of the electronic components (in Embodiment 1, electronic components 33$c$1 and 34$a$1).

In the imaging apparatus 10, the grounding contact strip 35$c$ of the shield case 35 is in contact with the inner peripheral wall surface of the peripheral wall portion 13$b$ of the rear case part 13. Thus, an electromagnetic shield for the electronic circuit unit 30 (imaging apparatus 10) can be formed also in the rear case part 13. Accordingly, it is possible to prevent the release of an electromagnetic wave from the electronic circuit to its periphery and also to protect the electronic circuit from being affected by an electromagnetic wave from the periphery. That is, the rear case part 13 functions as an electromagnetic shield while functioning as a heat dissipation part for the electronic components (in Embodiment 1, the electronic components 33$c$1 and 34$a$1).

In the imaging apparatus 10, the metal plate portion 37$a$ made of a metallic material is used for each first heat transfer member 37. The metal plate portion 37$a$ is in contact with the inner peripheral wall surface of the peripheral wall portion 13$b$ of the rear case part 13, and the potential of the rear case part 13 is made equal to that of the shield case 35 which forms an electromagnetic shield. Accordingly, it is possible to prevent the metal plate portion 37$a$ from acting as an antenna that releases an electromagnetic wave from the electronic circuit and receives an electromagnetic wave from its periphery.

In the imaging apparatus 10, the electronic component 34$b$1 mounted on the third board 34 is connected to the inner wall surface of the bottom wall portion 13$a$ of the rear case part 13 through the third heat transfer member 39. Thus, the heat of the electronic component 34$b$1 can be dissipated from the bottom wall portion 13$a$ of the shield case 35. Accordingly, the heat can be dissipated more efficiently and appropriately, making it possible to more appropriately prevent increase in the temperature of the electronic circuit unit 30.

In the imaging apparatus 10, the heat generated in the electronic circuit unit 30 can be dissipated appropriately to the outside from the peripheral wall portion 13$b$ of the rear case part 13, as mentioned above. Thus, it is possible to improve the degree of freedom in the layout of the part (in Embodiment 1, the third board 34) that forms the rear end surface of the electronic circuit unit 30 (the part facing the bottom wall portion 13$a$). Then, in Embodiment 1, in the third board 34 as the rear end surface of the electronic circuit unit 30, the region utilized for the thermal connection to the bottom wall portion 13$a$ can be made small. Accordingly, the connector member 34$c$ for the connection to the connecting cord 14 can be disposed on the third board 34.

In the imaging apparatus 10, the third heat transfer member 39 is made of a member being thermally conductive and excellent in shape conformability. Thus, tight contact can be secured between the electronic component 34$b$1 and the bottom wall portion 13$a$. Accordingly, thermal conductivity can be improved between the electronic component 34$b$1 and the bottom wall portion 13$a$.

In the imaging apparatus 10, regardless of the number of boards, it is possible to more appropriately prevent increase in the temperatures of the electronic components mounted on the boards, i.e., the electronic circuit unit 30. Thus, even when the electronic circuit formed of those electronic components is designed to be a high-performance electronic circuit, it is possible to more appropriately prevent increase in the temperatures of the electronic components, i.e., the electronic circuit unit 30, and thus to secure the performance thereof. This is because a higher-performance electronic circuit requires a larger number of electronic components, which increases the number of boards accordingly.

In the imaging apparatus 10, regardless of the number of boards, it is possible to more appropriately prevent increase in the temperatures of the electronic components mounted on the boards, i.e., the electronic circuit unit 30. Accordingly, the imaging apparatus 10 can be downsized easily. This is because when electronic components determined as necessary for forming a desired electronic circuit are all used, the number of boards necessary for mounting all the electronic components can be determined from the viewpoint of downsizing.

In the imaging apparatus 10, the generally thin, flat plate-shaped second heat transfer member 38 is provided appropriately between the boards arranged in parallel with each other in the imaging optical axis OA direction. Thus, the heat of the electronic components provided between the boards can be dissipated efficiently. Accordingly, the imaging apparatus 10 can be downsized easily. This is because the positions on the boards to mount the multiple electronic components can be determined from the viewpoint of downsizing.

The configuration of the imaging apparatus 10 secures the heat dissipation performance while allowing downsizing thereof. Thus, the imaging apparatus 10 may be attached easily at any position. Accordingly, the imaging apparatus 10 is suitable when used as an in-vehicle camera or a surveillance camera. Being easily attachable at any position on a vehicle, the imaging apparatus 10 can be attached to the vehicle while taking account of easiness in arranging the connecting cord 14, for example. Thus, it is possible to easily form a mechanism to support the driver's rear view recognition.

In sum, the imaging apparatus 10 of the present invention has a configuration in which an electronic circuit unit is fitted into a box-shaped housing member with one end open through that open end and by which a sufficient heat dissipation effect can be achieved without impeding downsizing thereof.

In Embodiment 1, the imaging apparatus 10 is described as an example of the imaging apparatus of the present invention. However, the imaging apparatus of the present invention is not limited to the imaging apparatus 10 of Embodiment 1 as long as: it is an imaging apparatus or an in-vehicle camera which includes an electronic circuit unit including an imaging device to acquire an object image formed by an imaging optical system, and a housing member having a box shape with one end open so that the electronic circuit unit may be fitted into the housing member from the open end and thereby housed in the housing member; the electronic circuit unit includes a thermally-conductive heat transfer member in contact with an outer peripheral surface thereof which is in parallel with a direction of the fitting; the heat transfer member includes a soft material portion in contact with the outer peripheral surface of the electronic circuit unit, and a plate portion in contact with the soft material portion and an inner peripheral wall surface of the housing member; and the soft material portion is made of a shape-conformable member.

Moreover, in Embodiment 1, the four first heat transfer members 37 are provided to the outer peripheral surfaces of the electronic circuit unit 30. However, the number of the first heat transfer members 37 is not limited that of Embodiment 1, and may be any number as long as heat can be released efficiently from the electronic circuit unit 30 on the basis of a consideration of the amount of heat generation in the electronic circuit unit 30 and the heat dissipation performance achievable when the peripheral wall portion 13b of the rear case part 13 serves as heat dissipation spots using the first heat transfer members 37.

Furthermore, in Embodiment 1, each first heat transfer member 37 is in a generally L-shape. However, such a shape is employed merely for the purpose of avoiding the interference with the grounding contact strip 35c and the three second-board supporting portions 35d located on the outer surfaces of the shield case 35. Hence, the shape is not limited to that of Embodiment 1, and may be set to an appropriate shape(s) based on the outer surfaces of the shield case 35, i.e., the outer peripheral surfaces of the electronic circuit unit 30.

In Embodiment 1, the first heat transfer members (37) correspond respectively to the outer peripheral surfaces of the electronic circuit unit 30. However, the configuration is not limited to that of Embodiment 1, and may be a single tubular member (the four first heat transfer members 37 joined together), for example, as long as it joins the shield case 35 of the electronic circuit unit 30 and the peripheral wall portion 13b of the rear case part 13 in the radial direction to improve the thermal conductivity between the electronic circuit unit 30 and the peripheral wall portion 13b.

In Embodiment 1, the first heat transfer members 37 adhere to the outer surfaces of the shield case 35 (the outer peripheral surfaces of the electronic circuit unit 30) by the adhesive force of the soft material portions 37b. However, the adhesion method is not limited to that of Embodiment 1, and each first heat transfer member 37 may adhere to the outer surface with such an adhesive member as a thermally-conductive adhesive tape therebetween. In this case, the first heat transfer member 37 can be prevented from falling off the electronic circuit unit 30 (shield case 35). Accordingly, the work of fitting the electronic circuit unit 30 relatively into the rear case part 13 can be made simple. In addition to this, the tightness of contact can be improved between the soft material portions 37b and the outer surfaces of the shield case 35, whereby the heat dissipation performance can be further improved.

In Embodiment 1, the claw portions 37c (both projecting strips 37d) and the positioning cutout portions 35f are provided as the positioning engagement portions to the first heat transfer members 37 and the shield case 35. However, the configuration is not limited to that of Embodiment 1, and the positioning engagement portions may not be provided.

Embodiment 2

Figure 12:
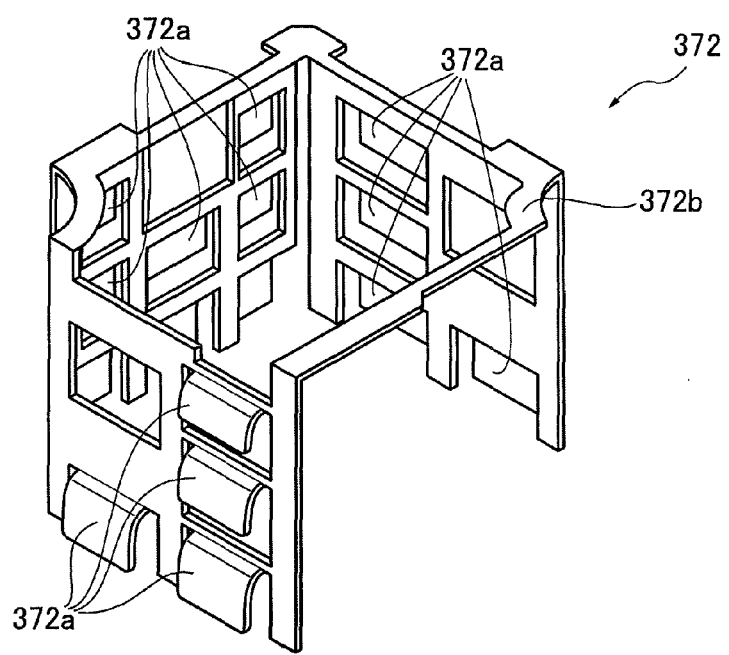
FIG. 12 is an explanatory view for describing a configuration of a first heat transfer member of another example.

Next, an imaging apparatus of Embodiment 2 will be described as another example. An imaging apparatus in Embodiment 2 differs from the imaging apparatus 10 of Embodiment 1 due to the configuration of a first heat transfer member 372 provided to the outer peripheral surface of the electronic circuit unit 30. The basic configuration of the imaging apparatus of Embodiment 2 is the same as that of the imaging apparatus 10 of Embodiment 1. So, the common components are denoted by the same reference signs, and detailed description thereof is omitted. FIG. 12 is a schematic perspective view showing the first heat transfer member 372.

In the imaging apparatus of Embodiment 2, the first heat transfer member 372 (see FIG. 12) is provided to the outer peripheral surfaces of the electronic circuit unit 30. Like the first heat transfer members 37 of Embodiment 1, the first heat transfer member 372 joins the shield case 35 of the electronic circuit unit 30 and the peripheral wall portion 13b of the rear case part 13 in the radial direction for the purpose of improving the thermal conductivity between the electronic circuit unit 30 and the peripheral wall portion 13b. The first heat transfer member 372 is formed of a member being thermally conductive, and is made of a metallic material in Embodiment 2. As shown in FIG. 12, the first heat transfer member 372 has a tubular shape which is substantially rectangle in a cross section perpendicular to the imaging optical axis OA, and one of the lateral surfaces parallel to the imaging optical axis OA is open. The first heat transfer member 372 has such a shape and a size that it can surround the electronic circuit unit 30, i.e., the shield case 35 in contact therewith. The first heat transfer member 372 includes an engagement frame portion 372b engageable with the part (the third board 34) that forms the rear end surface of the electronic circuit unit 30 (the part facing the bottom wall portion 13a).

The first heat transfer member 372 also includes multiple bulging strip portions 372a on each of three lateral surfaces, i.e., the lateral surfaces other than the one open lateral surface. Each bulging strip portion 372a bulges outward in the radial direction from its corresponding lateral surface in an elastically deformable manner. In Embodiment 2, the bulging strip portion 372a is formed by partially cutting out the lateral surface and deforming a strip portion obtained by the cutting into a shape bulging outward in the radial direction. A bulging end portion of each bulging strip portion 372a extends toward the front side in the imaging optical axis OA direction. The distance the bulging strip portion 372a bulges from the lateral surface is set larger than the gap between the outer peripheral surface of the electronic circuit unit 30 (the outer surface of the shield case 35) and the inner peripheral wall surface of the peripheral wall portion 13b of the rear case part 13.

Though not illustrated, the first heat transfer member 372 is relatively fit around the assembled electronic circuit unit 30 to be attached to the outer peripheral surfaces of the electronic circuit unit 30 (the outer surfaces of the shield case 35). Like the imaging apparatus 10 of Embodiment 1, the electronic circuit unit 30 with the first heat transfer member 372 attached thereto is inserted relatively into the rear case part 13 along the imaging optical axis OA. Here, the first heat transfer member 372 is made of a metallic material, and the bulging strip portions 372a are located outward thereof, hence securing the slidability of the first heat transfer member 372 and the inner peripheral wall surfaces of the peripheral wall portion 13b of the rear case part 13 made of an aluminum alloy. Accordingly, although the first heat transfer member 372 is provided to the outer peripheral surfaces of the electronic circuit unit 30 (shield case 35), the electronic circuit unit 30 can be easily inserted relatively into the rear case part 13. Specifically, in Embodiment 2, since the bulging end potion of each bulging strip portion 372a extends toward the front side in the imaging optical axis OA direction, the bulging strip portion 372a of the first heat transfer member 372 is prevented from being caught on the end portion of the opening in the rear case part 13 (the end portion of the peripheral wall portion 13b). Hence, the electronic circuit unit 30 may be inserted relatively into the rear case part 13 more easily.

As the electronic circuit unit 30 is inserted relatively into the rear case part 13, the bulging strip portions 372a of the first heat transfer member 372 are brought into contact with the peripheral wall portion 13b of the rear case part 13 while being appropriately deformed. As a result, the electronic circuit unit 30 equipped with the first heat transfer member 372 is fitted in the rear case part 13. Thereafter, the assembly procedure is performed as in the case of the imaging apparatus 10 of Embodiment 1.

Since the configuration of the imaging apparatus of Embodiment 2 is basically the same as that of the imaging apparatus 10 in FIG. 2, the same advantageous effects can be achieved except for the advantageous effects achievable by the first heat transfer members 37 of Embodiment 1. Thus, in the following, advantageous effects achievable by the first heat transfer member 372 will be described.

In the imaging apparatus of Embodiment 2, the outer peripheral surfaces of the electronic circuit unit 30 are connected to the peripheral wall portion 13b of the rear case part 13 through the first heat transfer member 372. Thus, the heat generated in the electronic circuit unit 30 can be transferred to the peripheral wall portion 13b. The heat can be then dissipated to the outside from the peripheral wall portion 13b of the rear case part 13. Accordingly, the heat can be dissipated (released) efficiently.

Moreover, in the imaging apparatus of Embodiment 2, the bulging strip portions 372a of the first heat transfer member 372 attached to the electronic circuit unit 30 are pressed by their own elastic force against the inner peripheral wall surfaces of the peripheral wall portion 13b of the rear case part 13. Thus, the tightness of contact can be improved between the first heat transfer member 372 and the peripheral wall portion 13b (inner peripheral wall surfaces). Accordingly, thermal conductivity can be improved between the first heat transfer member 372 and the peripheral wall portion 13b.

Furthermore, the imaging apparatus of Embodiment 2 is configured such that the first heat transfer member 372 and the peripheral wall portion 13b of the rear case part 13 are in contact with each other at the bulging strip portions 372a and the inner peripheral wall surfaces of the peripheral wall portion 13b of the rear case part 13. Accordingly, the slidability of the first heat transfer member 372 and the peripheral wall portion 13b of the rear case part 13 is secured for the relative insertion of the electronic circuit unit 30 into the rear case part 13.

In the imaging apparatus of Embodiment 2, the bulging end portions of the bulging strip portions 372a of the first heat transfer member 372 extend toward the front side in the imaging optical axis OA direction. Thus, the bulging strip portions 372a of the first heat transfer member 372 are prevented from being caught on the end portion of the opening in the rear case part 13 (the end portion of the peripheral wall portion 13b). Accordingly, the electronic circuit unit 30 can be inserted relatively into the rear case part 13 more easily.

In the imaging apparatus of Embodiment 2, the single first heat transfer member 372 is fitted around the electronic circuit unit 30, and the engagement frame portion 372b is provided to the first heat transfer member 372. Accordingly, the first heat transfer member 372 can be prevented from being displaced from the shield case 35 in the front-rear direction at the time of the fitting.

In the imaging apparatus of Embodiment 2, the first heat transfer member 372 located between the electronic circuit unit 30 and the peripheral wall portion 13b (inner peripheral wall surfaces) of the rear case part 13 is such that the elastic bulging strip portions 372a are pressed by the return force thereof against the outer surfaces of the shield case 35. Thus, the tightness of contact can be improved between the first heat transfer member 372 and the shield case 35. Accordingly, thermal conductivity can be improved between the electronic circuit unit 30 and the first heat transfer member 372.

In the imaging apparatus of Embodiment 2, the shield case 35 of the electronic circuit unit 30 and the peripheral wall portion 13b can be joined in the radial direction by the first heat transfer member 372. Thus, the number of components can be reduced. Accordingly, the assembly work can be made simpler, thereby reducing the manufacturing cost.

In sum, the imaging apparatus of Embodiment 2 has a configuration in which an electronic circuit unit is fitted into a box-shaped housing member with one end open through that open end and by which a sufficient heat dissipation effect can be achieved without impeding downsizing thereof.

In the imaging apparatus of the example described above, the outer peripheral surfaces of the electronic circuit unit are connected to the inner peripheral wall surface of the housing member through each heat transfer member. Thus, the heat generated in the electronic circuit unit can be transferred to the inner peripheral wall surfaces and dissipated (released) from the inner peripheral wall surfaces to the outside. Accordingly, the heat can be dissipated (released) efficiently.

Moreover, the electronic circuit unit and the heat transfer members are made in contact with each other by the soft material portions that are pressed against the outer surfaces of the electronic circuit unit and the inner surfaces of the plate portions. Thus, tight contact can be secured between the electronic circuit unit and the soft material portions and between the soft material portions and the plate portions. Accordingly, thermal conductivity can be improved between the electronic circuit unit and the heat transfer members.

Furthermore, the electronic circuit unit and the heat transfer members are made in contact with each other at the plate members and the inner peripheral wall surfaces of the housing member. Thus, the slidability of the heat transfer members and the inner peripheral wall surfaces of the housing member is secured for the relative insertion of the electronic circuit unit into the housing member. This makes it possible to make the work of housing the electronic circuit unit into the housing member simple while achieving a desired contact state of the heat transfer members with the electronic circuit unit, i.e., a desired positional relationship between the contact portions and a desired tight contact therebetween. Accordingly, the heat dissipation performance can be achieved as intended.

In addition, in the heat transfer members located between the electronic circuit unit and the inner peripheral wall surfaces of the housing member, the plate portions are pressed by the return force of the elastic soft material portions against the inner peripheral wall surfaces of the housing member. Thus, the tightness of contact can be improved between the plate portions and the inner peripheral wall surfaces of the housing member. Accordingly, thermal conductivity can be improved between the heat transfer members and the inner peripheral wall surfaces of the housing member.

The electronic circuit unit includes an electromagnetic shielding plate forming the outer peripheral surfaces, and the soft material portions of the heat transfer members are in contact with the electromagnetic shielding plate. Accordingly, it is possible to prevent the release of an electromagnetic wave from the electronic circuit unit to its periphery and also to protect the electronic circuit unit from being affected by an electromagnetic wave from the periphery. It is also possible to utilize the electromagnetic shielding plate as a heat transfer member.

The heat transfer members are formed as first heat transfer members, and the electronic circuit unit includes: at least one circuit board which has electronic components mounted thereon and is provided to be perpendicular to the fitting direction; and a thermally-conductive second heat transfer member which extends along the circuit board and thermally connects the electronic components and the first heat transfer members. Thus, the electronic components can be thermally connected to the inner peripheral wall surfaces of the housing member through the second heat transfer member and the first heat transfer members. Accordingly, heat generated in the electronic components can be dissipated (released) efficiently.

The second heat transfer member is made of a shape-conformable member. Thus, it is possible to suppress force which is applied to the electronic components on the circuit board as a result of the contact of the second heat transfer member with the electronic components. This makes it possible to secure tight contact with the electronic components without losing the reliability of the electronic circuit. Accordingly, thermal conductivity can be improved between the electronic components and the first heat transfer members.

The electronic circuit unit includes the electromagnetic shielding plate that forms the outer peripheral surfaces; the soft material portions of the first heat transfer members are in contact with the electromagnetic shielding plate; and the second heat transfer member is in contact with the electromagnetic shielding plate in a direction perpendicular to the fitting direction. Accordingly, it is possible to prevent the release of an electromagnetic wave from the electronic circuit unit to its periphery and also to protect the electronic circuit unit from being affected by an electromagnetic wave from the periphery. It is also possible to connect the first and the second transfer members by the electromagnetic shielding plate.

The soft material portions each have an adhesive property, and the soft material portions and their respective plate portions adhere to each other by adhesive force of the soft material portions. Accordingly, tight contact can be secured between the soft material portions and the plate portions while making the configuration of each first heat transfer member simple.

The soft material portion of each of the heat transfer members adheres to the outer peripheral surface of the electronic circuit unit with a thermally-conductive adhesive member interposed therebetween. Thus, the first heat transfer members can be prevented from falling off the electronic circuit unit. Accordingly, the work of fitting the electronic circuit unit relatively into the housing member can be made simple. In addition to this, the tightness of contact can be improved between the soft material portions and the outer peripheral surfaces of the electronic circuit unit, whereby the heat dissipation performance can be further improved.

The electromagnetic shielding plate and the plate portions include positioning engagement portions engaging with each other to prevent relative displacement between the electromagnetic shielding plate and the plate portions in the fitting direction. This makes it possible to securely maintain a desired contact state of each heat transfer member with the electronic circuit unit when the electronic circuit unit is fitted relatively into the housing member. Accordingly, the heat dissipation performance can be achieved as intended.

The second heat transfer member is in contact with any of the electronic components which has a large amount of heat generation. Accordingly, the heat of the contacted electronic component can be transferred efficiently to the first heat transfer members while being prevented from being transferred to the other electronic component(s).

The soft material portions are made of a silicone. Accordingly, it is possible to easily form soft material portions that have adhesibility available on their surfaces in addition to the shape conformability.

The second heat transfer member is made of a silicone. Accordingly, it is possible to easily form a second heat transfer member that has adhesibility available on its surfaces in addition to the shape conformability.

An in-vehicle camera using the imaging apparatus with above-described configuration has a configuration that allows downsizing thereof while securing a heat dissipation performance. Thus, the in-vehicle camera is easily attachable to any position. Accordingly, the in-vehicle camera can appropriately support the driver's visual recognition.

Meanwhile, in Embodiment 2 described above, the first heat transfer member 372 is partially cut out, and the cutout portions are subjected to bending to form the bulging strip portions 372a. However, the processing method is not limited to that of Embodiment 2, and the bulging strip portions 372a may be formed by drawing, for example, as long as they bulge from the lateral surfaces in such an elastically deformable manner that the first heat transfer member 372 can be fitted in the gaps between the outer peripheral surfaces of the electronic circuit unit 30 (the outer surfaces of the shield case 35) and the inner peripheral wall surfaces of the peripheral wall portion 13b of the rear case part 13.

Moreover, in the examples described above, the shield case 35 is provided to the electronic circuit unit 30. However, the configuration is not limited to those of the examples, and the shield case 35 may not be provided from the viewpoint of the heat dissipation performance of the electronic circuit unit 30.

Furthermore, in the examples, the electronic circuit unit 30 includes the second heat transfer member 38 which extends in the radial direction at a position between the boards (extends along the boards). However, the second heat transfer member 38 is not limited to those of the examples, and may be one that utilizes terminals of the electronic components mounted on the boards or one that forms heat transfer passages on the boards, for example, as long as it extends in the radial direction in such a manner that the electronic components and the first heat transfer member(s) (37, 372) are thermally connected to each other.

In the examples, the imaging apparatus 10 is described as being used as an in-vehicle camera that forms a mechanism to support the rear view recognition. However, the application is not limited to those of the examples. The imaging apparatus 10 can acquire the advantageous effects described above as long as it is an imaging apparatus with a configuration in which an electronic circuit unit is fitted into a housing member with one end open to be housed therein. Thus, the imaging apparatus 10 has a wide range of applications such for example as an in-vehicle camera as a drive recorder in a vehicle for recording circumstances of an accident, a surveillance camera inside the cabin of a vehicle, and a surveillance camera installed on an ATM.

In the examples, the configuration is such that the case 11 is formed by coupling the rear case part 13 with the front case part 12 which sealingly retains the optical element array 21 to form the imaging optical system 20. However, the configuration is not limited to those in the examples, and only needs to be one including a housing member which has a box shape with one end open and allows the electronic circuit unit to be fitted into the housing member to be housed therein.

In the examples, the electronic circuit unit 30 includes the shield case 35. However, the configuration is not limited to those of the examples. Anything will function as an electromagnetic shield if it is made of an electrically conductive material and electrically connected to the reference potential in the electronic circuit or the ground level. Thus, the imaging apparatus 10 may be formed by using a resin case having a metal film covering the inside thereof, for example.

Hereinabove, the imaging apparatus of the present invention is described based on Examples 1 and 2. However, the specific configurations are not limited to those of Examples 1 and 2. Any change, addition, and so on in the design are allowed without departing from the gist of the present invention.

What is claimed is:

1. An imaging apparatus comprising:
an electronic circuit unit including an imaging device to acquire an object image imaged by an imaging optical system; and
a housing member having a box shape with one end open to contain the electronic circuit unit by fitting into the housing member through the open end,
wherein the electronic circuit unit includes a thermally-conductive heat transfer member which is in contact with an electromagnetic shield forming an outer peripheral surface which is parallel with a fitting direction of the electronic circuit unit into the housing member, and wherein the outer peripheral surface of the electromagnetic shield has a box shape which corresponds to the box shape of the housing member,
wherein the heat transfer member includes a plate-shaped, soft material portion which is in contact with the electromagnetic shield and a plate portion which is in contact with the plate-shaped, soft material portion and an inner peripheral wall surface of the housing member,
wherein the soft material portion is made of a plate-shaped shape-conformable member which is parallel to the box-shaped outer peripheral surface of the electromagnetic shield, and which is parallel to the inner peripheral wall surface of the housing member, and
wherein the electromagnetic shield, the plate-shaped shape conformable member of the soft material portion, and the plate portion are arranged in the housing member in order, in a radial direction that is perpendicular to the box-shaped outer peripheral surface of the electromagnetic shield, the plate-shaped shape conformable material, and the plate portion, from an inside of the housing member to an outside, such that the plate-shaped shape conformable material is sandwiched between the box-shaped outer peripheral surface of the electromagnetic shield and the plate portion, in the radial direction, and such that the plate portion is sandwiched between the plate-shaped shape conformable material and the inner peripheral wall surface of the housing member, in the radial direction, and wherein the radial direction is perpendicular to the fitting direction.

2. The imaging apparatus according to claim 1, wherein the heat transfer member includes a first heat transfer member, and the electronic circuit unit includes: at least one circuit board which has one or more electronic components mounted thereon and is provided to be perpendicular to the fitting direction; and a thermally-conductive second heat transfer member which extends along the circuit board and thermally connects the electronic components and the first heat transfer member.

3. The imaging apparatus according to claim 2, wherein the second heat transfer member is made of a shape-conformable member.

4. The imaging apparatus according to claim 2, wherein the soft material portion of the first heat transfer member is in contact with the electromagnetic shield and the second heat transfer member is in contact with the electromagnetic shield in a direction perpendicular to the fitting direction.

5. The imaging apparatus according to claim 1, wherein the soft material portion has an adhesive property, and the soft material portion and the plate portion adhere to each other by adhesive force of the soft material portion.

6. The imaging apparatus according to claim 1, wherein the soft material portion of the heat transfer member adheres to the outer peripheral surface of the electronic circuit unit with thermally-conductive adhesive members interposed therebetween.

7. The imaging apparatus according to claim 1, wherein the electromagnetic shield and the plate portion include positioning engagement portions engaging with each other to prevent relative displacement between the electromagnetic shield and the plate portion in the fitting direction.

8. The imaging apparatus according to claim 2, wherein the second heat transfer member is in contact with any of the electronic components which has a large amount of heat generation.

9. The imaging apparatus according to claim 1, wherein the soft material portion is made of silicone.

10. The imaging apparatus according to claim 2, wherein the second heat transfer member is made of silicone.

11. An in-vehicle camera using the imaging apparatus according to claim 1.

* * * * *